(12) United States Patent
Chen et al.

(10) Patent No.: US 8,281,535 B2
(45) Date of Patent: Oct. 9, 2012

(54) PACKAGING PREFINISHED FIBER CEMENT ARTICLES

(75) Inventors: Yongjun Chen, Alta Loma, CA (US); Luan Giang, Diamond Bar, CA (US); Caidian Luo, Alta Loma, CA (US); Weiling Peng, Etiwanda, CA (US)

(73) Assignee: James Hardie Technology Limited, Dublin (IE)

( * ) Notice: Subject to any disclaimer, the term of this patent is extended or adjusted under 35 U.S.C. 154(b) by 988 days.

(21) Appl. No.: 11/715,685

(22) Filed: Mar. 8, 2007

(65) Prior Publication Data

US 2007/0196611 A1 Aug. 23, 2007

Related U.S. Application Data

(63) Continuation-in-part of application No. 10/620,711, filed on Jul. 16, 2003.

(60) Provisional application No. 60/396,303, filed on Jul. 16, 2002.

(51) Int. Cl.
*E04B 9/00* (2006.01)

(52) U.S. Cl. ...... 52/446; 52/309.15; 428/41.7; 428/41.8

(58) Field of Classification Search ............... 52/309.13, 52/319.15, 404.1, 506.01, 446, 311.1, 309.15; 428/40.1, 41.7, 41.8
See application file for complete search history.

(56) References Cited

U.S. PATENT DOCUMENTS

| 369,216 | A | 8/1887 | Temple |
|---|---|---|---|
| 494,763 | A | 4/1893 | Smidth |
| 525,442 | A | 9/1894 | Burrows |
| 575,074 | A | 1/1897 | Smith |
| 774,114 | A | 11/1904 | Spear |
| 815,801 | A | 3/1906 | Depew et al. |
| 1,399,023 | A | 12/1921 | Murray |
| 1,510,497 | A | 10/1924 | Keller |
| 1,630,801 | A | 5/1927 | Parsons |
| 1,634,809 | A | 7/1927 | Weiss |
| 1,698,557 | A | 1/1929 | O'Brien |
| 1,856,932 | A | 5/1932 | Shaw |

(Continued)

FOREIGN PATENT DOCUMENTS

AU 515151 7/1980

(Continued)

OTHER PUBLICATIONS

U.S. Appl. No. 10/055,214, filed Oct. 24, 2001, entitled Adhesive Mixture for Bonding Fluorohydrocarbon Film to Fibrous Cementitious Materials; inventors Weiling Peng and Jeffrey Bergh; (Abandoned).

(Continued)

*Primary Examiner* — William Gilbert
(74) *Attorney, Agent, or Firm* — Knobbe, Martens, Olson & Bear, LLP

(57) ABSTRACT

Protected prefinished fiber cement articles are manufactured by applying a protective layer on the finished surface of a fiber cement article. The protective layer protects the finish layer of the prefinished fiber cement article during handling, storage, and transport. Removing the protective layer leaves no residue on the finish layer, does not damage the finish layer, and does not substantially tear the protective layer. Protected prefinished fiber cement article are typically stacked on pallets for storage and transport. Optionally, spacers may be placed between the stacked protected prefinished fiber cement article.

23 Claims, 6 Drawing Sheets

U.S. PATENT DOCUMENTS

| | | |
|---|---|---|
| 1,856,936 A | 5/1932 | Turner |
| 1,871,843 A | 8/1932 | Ericson |
| 1,930,024 A | 10/1933 | Varden |
| 1,943,663 A | 1/1934 | Ericson |
| 1,959,519 A | 5/1934 | Black |
| 1,976,684 A | 10/1934 | Munroe et al. |
| 1,976,984 A | 10/1934 | Condon et al. |
| 1,978,519 A | 10/1934 | Willock et al. |
| 1,995,393 A | 3/1935 | Manske |
| 1,997,939 A | 4/1935 | Loucks |
| 2,009,619 A | 7/1935 | Huffine |
| 2,062,149 A | 11/1936 | Stark et al. |
| 2,082,791 A | 6/1937 | Copeman |
| 2,182,372 A | 12/1939 | Cox et al. |
| 2,224,351 A | 12/1940 | Kaye |
| 2,253,753 A | 8/1941 | Black |
| 2,276,170 A | 3/1942 | Elmendorf |
| 2,317,634 A | 4/1943 | Olsen |
| 2,320,702 A | 6/1943 | Marchese et al. |
| 2,323,230 A | 6/1943 | McAvoy |
| 2,324,325 A | 7/1943 | Schuh |
| 2,354,639 A | 7/1944 | Seymour |
| 2,400,357 A | 5/1946 | Krajci |
| 2,413,794 A | 1/1947 | Small |
| 2,447,275 A | 8/1948 | Price |
| 2,511,083 A | 6/1950 | Small |
| 2,517,122 A | 8/1950 | Lockwood |
| 2,518,281 A | 8/1950 | Camp |
| 2,624,298 A | 1/1953 | Farren |
| 2,694,025 A | 11/1954 | Slayter et al. |
| 2,724,872 A | 11/1955 | Herbes |
| 2,782,463 A | 2/1957 | Bergvall et al. |
| 2,928,143 A | 3/1960 | Newton |
| 2,956,310 A | 10/1960 | Roop |
| 2,966,260 A * | 12/1960 | Johnson .................. 206/595 |
| 3,046,700 A | 7/1962 | Davenport |
| 3,047,985 A | 8/1962 | Murphy |
| 3,106,503 A | 10/1963 | Frobisher |
| 3,111,450 A | 11/1963 | Stevens |
| 3,133,854 A | 5/1964 | Simms |
| 3,173,229 A | 3/1965 | Weber |
| 3,181,662 A | 5/1965 | Maertzig, Jr. |
| 3,214,876 A | 11/1965 | Mattes |
| 3,228,823 A | 1/1966 | Usala et al. |
| 3,235,039 A | 2/1966 | O'Donnell |
| 3,236,932 A | 2/1966 | Grigas et al. |
| 3,274,743 A | 9/1966 | Blum, Jr. |
| 3,284,980 A | 11/1966 | Dinkel |
| 3,288,823 A | 11/1966 | Vanderwerff |
| 3,313,675 A | 4/1967 | Petropoulos et al. |
| 3,333,379 A | 8/1967 | Harris |
| 3,336,710 A | 8/1967 | Raynes |
| 3,358,355 A * | 12/1967 | Youssi et al. .................. 29/424 |
| 3,408,786 A | 11/1968 | Snyker |
| 3,415,019 A | 12/1968 | Andersen |
| 3,416,275 A | 12/1968 | Van Loghem et al. |
| 3,419,461 A | 12/1968 | Gebhard, Jr. et al. |
| 3,421,281 A | 1/1969 | Harris |
| 3,452,861 A | 7/1969 | Erwin |
| 3,475,261 A | 10/1969 | Ettore et al. |
| 3,481,093 A | 12/1969 | Davidson |
| 3,492,194 A | 1/1970 | Rauch |
| 3,527,004 A | 9/1970 | Sorenson |
| 3,606,720 A | 9/1971 | Cookson |
| 3,616,173 A | 10/1971 | Green et al. |
| 3,625,808 A | 12/1971 | Martin |
| 3,635,742 A | 1/1972 | Fujimasu |
| 3,660,955 A | 5/1972 | Simon |
| 3,663,341 A | 5/1972 | Veneziale, Jr. |
| 3,663,353 A | 5/1972 | Long et al. |
| 3,703,795 A | 11/1972 | Mattes |
| 3,708,943 A | 1/1973 | Thomas et al. |
| 3,723,171 A | 3/1973 | Fuchs |
| 3,729,368 A | 4/1973 | Ingham et al. |
| 3,738,900 A | 6/1973 | Matzke |
| 3,754,365 A | 8/1973 | Carrick et al. |
| 3,780,483 A | 12/1973 | Mattes |
| 3,782,985 A | 1/1974 | Gebhardt |
| 3,797,179 A | 3/1974 | Jackson |
| 3,797,190 A | 3/1974 | Widdowson |
| 3,804,058 A | 4/1974 | Messenger |
| 3,818,668 A | 6/1974 | Charniga |
| 3,835,604 A | 9/1974 | Hoffmann, Jr. |
| 3,847,633 A | 11/1974 | Race |
| 3,866,378 A | 2/1975 | Kessler |
| 3,869,295 A | 3/1975 | Bowles et al. |
| 3,888,617 A | 6/1975 | Barnett |
| 3,902,911 A | 9/1975 | Messenger |
| 3,921,346 A | 11/1975 | Sauer et al. |
| 3,928,701 A | 12/1975 | Roehner |
| 3,965,633 A | 6/1976 | Carroll |
| 3,974,024 A | 8/1976 | Yano et al. |
| 3,986,312 A | 10/1976 | Calhoun et al. |
| 3,992,845 A | 11/1976 | Grzesiek et al. |
| 4,010,587 A | 3/1977 | Larsen |
| 4,010,589 A | 3/1977 | Gross |
| 4,015,392 A | 4/1977 | Eaton |
| 4,028,859 A | 6/1977 | Bellagamba et al. |
| 4,034,528 A | 7/1977 | Sanders et al. |
| 4,047,355 A | 9/1977 | Knorr |
| 4,052,829 A | 10/1977 | Chapman |
| 4,058,944 A | 11/1977 | Rieger et al. |
| 4,063,393 A | 12/1977 | Toti |
| 4,065,899 A | 1/1978 | Kirkhuff |
| 4,070,843 A | 1/1978 | Leggiere et al. |
| 4,076,884 A | 2/1978 | Riley et al. |
| 4,079,562 A | 3/1978 | Englert et al. |
| 4,082,830 A | 4/1978 | Cogliano |
| 4,101,335 A | 7/1978 | Barrable et al. |
| 4,102,106 A | 7/1978 | Golder et al. |
| 4,104,103 A | 8/1978 | Tarullo |
| 4,104,840 A | 8/1978 | Heintz et al. |
| 4,110,507 A | 8/1978 | Colledge |
| 4,112,647 A | 9/1978 | Scheid |
| 4,117,185 A | 9/1978 | Cummins et al. |
| 4,118,236 A | 10/1978 | Erskine |
| 4,128,696 A | 12/1978 | Goebel et al. |
| 4,132,555 A | 1/1979 | Barrable |
| 4,150,517 A | 4/1979 | Warner, Sr. |
| 4,152,878 A | 5/1979 | Balinski |
| 4,166,749 A | 9/1979 | Sterrett et al. |
| 4,183,188 A | 1/1980 | Goldsby |
| 4,184,906 A | 1/1980 | Young |
| 4,187,658 A | 2/1980 | Reinwall, Jr. |
| 4,203,788 A | 5/1980 | Clear |
| 4,211,525 A | 7/1980 | Vetter et al. |
| 4,222,785 A | 9/1980 | Henderson |
| 4,231,573 A | 11/1980 | Kelly |
| 4,268,317 A | 5/1981 | Rayl |
| 4,274,239 A | 6/1981 | Carroll |
| 4,292,364 A | 9/1981 | Wesch et al. |
| 4,298,647 A | 11/1981 | Cancio et al. |
| 4,307,551 A | 12/1981 | Crandell |
| 4,321,780 A | 3/1982 | Hooper et al. |
| 4,327,528 A | 5/1982 | Fritz |
| 4,337,290 A | 6/1982 | Kelly et al. |
| 4,339,489 A | 7/1982 | Barker et al. |
| 4,343,127 A | 8/1982 | Greve et al. |
| 4,361,616 A | 11/1982 | Bomers |
| 4,362,566 A | 12/1982 | Hinterwaldner et al. |
| 4,366,657 A | 1/1983 | Hopman |
| 4,370,166 A | 1/1983 | Powers et al. |
| 4,373,955 A | 2/1983 | Bouchard et al. |
| 4,373,957 A | 2/1983 | Pedersen et al. |
| 4,377,977 A | 3/1983 | Wurster |
| 4,379,553 A | 4/1983 | Kelly |
| 4,380,564 A | 4/1983 | Cancio et al. |
| 4,392,336 A | 7/1983 | Ganssle |
| 4,399,643 A | 8/1983 | Hafner |
| 4,404,057 A | 9/1983 | Morrison et al. |
| 4,406,703 A | 9/1983 | Guthrie et al. |
| 4,420,351 A | 12/1983 | Lussi et al. |
| 4,424,261 A | 1/1984 | Keeling et al. |
| 4,429,214 A | 1/1984 | Brindley et al. |
| 4,434,119 A | 2/1984 | Teare |
| 4,441,944 A | 4/1984 | Massey |
| 4,442,219 A | 4/1984 | TenEyck et al. |

| | | | | | | |
|---|---|---|---|---|---|---|
| 4,462,730 A | 7/1984 | Knohl | | 5,117,600 A | 6/1992 | Yerushalmi et al. |
| 4,462,835 A | 7/1984 | Car et al. | | 5,143,780 A | 9/1992 | Balassa |
| 4,463,043 A | 7/1984 | Reeves et al. | | 5,155,958 A | 10/1992 | Huff |
| 4,463,532 A | 8/1984 | Faw | | 5,167,710 A | 12/1992 | Leroux et al. |
| 4,465,729 A | 8/1984 | Cancio et al. | | 5,177,305 A | 1/1993 | Pichat et al. |
| 4,501,830 A | 2/1985 | Miller et al. | | 5,178,924 A | 1/1993 | Johnson et al. |
| 4,502,256 A | 3/1985 | Hahn et al. | | 5,198,052 A | 3/1993 | Ali |
| 4,504,320 A | 3/1985 | Rizer et al. | | 5,198,275 A | 3/1993 | Klein |
| 4,506,486 A | 3/1985 | Culpepper, Jr. et al. | | 5,210,989 A | 5/1993 | Jakel |
| 4,511,626 A | 4/1985 | Schumacher | | 5,226,274 A | 7/1993 | Sommerstein |
| 4,514,947 A | 5/1985 | Grail | | 5,229,437 A | 7/1993 | Knight |
| 4,553,366 A | 11/1985 | Guerin et al. | | 5,234,754 A | 8/1993 | Bache |
| 4,559,894 A | 12/1985 | Thompson | | D339,642 S | 9/1993 | Blazley et al. |
| 4,586,304 A | 5/1986 | Flammand et al. | | 5,242,736 A | 9/1993 | Van Erden et al. |
| 4,588,443 A | 5/1986 | Bache | | 5,244,318 A | 9/1993 | Arai et al. |
| 4,592,185 A | 6/1986 | Lynch et al. | | 5,245,811 A | 9/1993 | Knorr |
| 4,626,398 A | 12/1986 | Vetter et al. | | 5,247,773 A | 9/1993 | Weir |
| 4,637,860 A | 1/1987 | Harper et al. | | 5,252,526 A | 10/1993 | Whittemore |
| 4,640,715 A | 2/1987 | Heitzmann et al. | | 5,259,872 A | 11/1993 | Shinozaki et al. |
| 4,641,469 A | 2/1987 | Wood | | 5,268,226 A | 12/1993 | Sweeney |
| 4,642,137 A | 2/1987 | Heitzmann et al. | | 5,282,317 A | 2/1994 | Carter et al. |
| 4,661,398 A | 4/1987 | Ellis | | 5,297,370 A | 3/1994 | Greenstreet et al. |
| 4,670,079 A | 6/1987 | Thompson | | 5,301,484 A | 4/1994 | Jansson |
| 4,673,659 A | 6/1987 | Wood et al. | | 5,305,568 A | 4/1994 | Beckerman |
| 4,680,059 A | 7/1987 | Cook et al. | | 5,305,577 A | 4/1994 | Richards et al. |
| 4,685,263 A | 8/1987 | Ting | | 5,319,909 A | 6/1994 | Singleterry |
| 4,698,942 A | 10/1987 | Swartz | | 5,323,581 A | 6/1994 | Jakel |
| 4,728,710 A | 3/1988 | Goel | | 5,330,573 A | 7/1994 | Nakano et al. |
| 4,730,398 A | 3/1988 | Stanton | | 5,334,242 A | 8/1994 | O'Toole |
| 4,737,191 A | 4/1988 | Meynarddi | | 5,338,349 A | 8/1994 | Farrar |
| 4,748,771 A | 6/1988 | Lehnert et al. | | 5,349,802 A | 9/1994 | Kariniemi |
| 4,779,313 A | 10/1988 | Gonas | | 5,352,288 A | 10/1994 | Mallow |
| 4,780,141 A | 10/1988 | Double et al. | | 5,352,290 A | 10/1994 | Takeshita et al. |
| 4,789,604 A | 12/1988 | van der Hoeven et al. | | 5,355,649 A * | 10/1994 | Berridge ......................... 52/520 |
| 4,793,861 A | 12/1988 | Sohm et al. | | 5,358,676 A | 10/1994 | Jennings et al. |
| 4,803,105 A | 2/1989 | Kretow et al. | | 5,369,924 A | 12/1994 | Neudorf et al. |
| 4,808,229 A | 2/1989 | Arhelger et al. | | 5,372,678 A | 12/1994 | Sagstetter et al. |
| 4,811,538 A | 3/1989 | Lehnert et al. | | 5,378,279 A | 1/1995 | Conroy |
| 4,827,621 A | 5/1989 | Borsuk | | 5,391,245 A | 2/1995 | Turner |
| 4,840,672 A | 6/1989 | Baes | | 5,394,672 A | 3/1995 | Seem |
| 4,841,702 A | 6/1989 | Huettemann | | 5,395,672 A | 3/1995 | Pingaud |
| 4,842,649 A | 6/1989 | Heitzmann et al. | | 5,395,685 A | 3/1995 | Seth et al. |
| 4,854,101 A | 8/1989 | Champagne | | 5,397,631 A | 3/1995 | Green et al. |
| 4,858,402 A | 8/1989 | Putz | | 5,410,852 A | 5/1995 | Edgar et al. |
| 4,866,896 A | 9/1989 | Shreiner et al. | | 5,425,985 A | 6/1995 | Irvin |
| 4,870,788 A | 10/1989 | Hassan | | 5,425,986 A | 6/1995 | Guyette |
| 4,876,827 A | 10/1989 | Williams et al. | | 5,428,931 A | 7/1995 | Ragsdale |
| 4,894,102 A | 1/1990 | Halls et al. | | 5,437,934 A | 8/1995 | Witt et al. |
| 4,895,598 A | 1/1990 | Hedberg et al. | | 5,443,603 A | 8/1995 | Kirkendall |
| 4,906,408 A | 3/1990 | Bouniol | | 5,461,839 A | 10/1995 | Beck |
| 4,914,885 A | 4/1990 | Baker et al. | | 5,465,547 A | 11/1995 | Jakel |
| 4,924,644 A | 5/1990 | Lewis | | 5,475,961 A | 12/1995 | Menchetti |
| 4,927,696 A | 5/1990 | Berg et al. | | 5,477,617 A | 12/1995 | Guy |
| 4,930,287 A | 6/1990 | Volk et al. | | 5,482,550 A | 1/1996 | Strait |
| 4,937,993 A | 7/1990 | Hitchins et al. | | 5,501,050 A | 3/1996 | Ruel et al. |
| 4,952,631 A | 8/1990 | McAlpin et al. | | 5,511,316 A | 4/1996 | Fischer et al. |
| 4,955,169 A | 9/1990 | Shisko et al. | | 5,517,795 A | 5/1996 | Doke |
| 4,963,430 A | 10/1990 | Kish et al. | | 5,522,926 A | 6/1996 | Richard et al. |
| 4,969,250 A | 11/1990 | Hickman et al. | | 5,522,986 A | 6/1996 | Shi et al. |
| 4,969,302 A | 11/1990 | Coggan et al. | | 5,526,627 A | 6/1996 | Beck |
| 4,975,396 A | 12/1990 | Thiery | | 5,531,824 A | 7/1996 | Burkes et al. |
| 4,985,119 A | 1/1991 | Vinson et al. | | 5,545,297 A | 8/1996 | Andersen et al. |
| 4,995,605 A | 2/1991 | Conville | | 5,557,903 A | 9/1996 | Haddock |
| 4,999,056 A | 3/1991 | Rasmussen | | 5,561,173 A | 10/1996 | Dry |
| 5,017,232 A | 5/1991 | Miceli | | 5,564,233 A | 10/1996 | Norton |
| 5,022,207 A | 6/1991 | Hartnett | | 5,564,245 A | 10/1996 | Rademacher |
| 5,045,378 A | 9/1991 | Libby | | 5,565,026 A | 10/1996 | Hense et al. |
| 5,047,086 A | 9/1991 | Hayakawa et al. | | 5,580,378 A | 12/1996 | Shulman |
| 5,067,675 A | 11/1991 | Brant et al. | | 5,580,409 A | 12/1996 | Andersen et al. |
| D322,678 S | 12/1991 | Brathwaite | | 5,598,671 A | 2/1997 | Ting |
| 5,076,986 A | 12/1991 | Delvaux et al. | | 5,603,758 A | 2/1997 | Schreifels, Jr. et al. |
| 5,077,952 A | 1/1992 | Moure | | 5,603,798 A | 2/1997 | Bhat |
| 5,080,022 A | 1/1992 | Carlson | | 5,617,690 A | 4/1997 | Gibbs |
| 5,098,498 A | 3/1992 | Hale et al. | | 5,622,556 A | 4/1997 | Shulman |
| 5,106,557 A | 4/1992 | Rirsch et al. | | 5,631,097 A | 5/1997 | Andersen et al. |
| 5,108,679 A | 4/1992 | Rirsch et al. | | 5,634,314 A | 6/1997 | Champagne |
| 5,112,405 A | 5/1992 | Sanchez | | 5,648,144 A | 7/1997 | Maurer et al. |
| 5,114,617 A | 5/1992 | Smetana et al. | | 5,651,227 A | 7/1997 | Anderson |
| 5,115,621 A | 5/1992 | Kobayashi et al. | | 5,656,121 A | 8/1997 | Fukushi |

| | | | | | | |
|---|---|---|---|---|---|---|
| 5,658,670 | A | 8/1997 | Fukushi et al. | 6,164,032 | A | 12/2000 | Beck |
| 5,661,939 | A | 9/1997 | Coulis et al. | 6,164,214 | A | 12/2000 | Smorgon et al. |
| 5,673,489 | A | 10/1997 | Robell | 6,170,212 | B1 | 1/2001 | Suchyna et al. |
| 5,673,529 | A | 10/1997 | Treister et al. | 6,170,214 | B1 | 1/2001 | Treister et al. |
| 5,675,955 | A | 10/1997 | Champagne | 6,170,215 | B1 | 1/2001 | Nasi |
| 5,692,345 | A | 12/1997 | Mogaki et al. | 6,176,920 | B1 | 1/2001 | Murphy et al. |
| 5,694,727 | A | 12/1997 | Dobija | 6,195,952 | B1 | 3/2001 | Culpepper et al. |
| 5,697,189 | A | 12/1997 | Miller et al. | 6,226,947 | B1 | 5/2001 | Bado et al. |
| D388,884 | S | 1/1998 | Karnoski | 6,276,107 | B1 | 8/2001 | Waggoner et al. |
| 5,714,002 | A | 2/1998 | Styron | 6,277,189 | B1 | 8/2001 | Chugh |
| 5,718,758 | A | 2/1998 | Breslauer | 6,290,769 | B1 | 9/2001 | Carkner |
| 5,718,759 | A | 2/1998 | Stav et al. | 6,295,777 | B1 | 10/2001 | Hunter et al. |
| 5,724,783 | A | 3/1998 | Mandish | 6,298,626 | B2 | 10/2001 | Rudden |
| 5,725,652 | A | 3/1998 | Shulman | 6,308,486 | B1 | 10/2001 | Medland et al. |
| 5,728,246 | A | 3/1998 | Ewaschuk | 6,315,489 | B1 | 11/2001 | Watanabe |
| 5,729,946 | A | 3/1998 | Beck | 6,316,087 | B1 | 11/2001 | Lehan |
| 5,732,520 | A | 3/1998 | Maietta | 6,319,456 | B1 | 11/2001 | Gilbert et al. |
| 5,735,092 | A | 4/1998 | Clayton et al. | 6,324,807 | B1 | 12/2001 | Ishiko |
| 5,735,094 | A | 4/1998 | Zember | 6,346,146 | B1 | 2/2002 | Duselis et al. |
| 5,736,594 | A | 4/1998 | Boles et al. | 6,357,193 | B1 | 3/2002 | Morris |
| 5,741,844 | A | 4/1998 | Nass et al. | 6,365,081 | B1 | 4/2002 | Beck |
| 5,743,056 | A | 4/1998 | Balla-Goddard et al. | 6,367,208 | B1 | 4/2002 | Campbell et al. |
| 5,749,187 | A | 5/1998 | Umehara et al. | 6,367,220 | B1 | 4/2002 | Krause et al. |
| 5,759,654 | A | 6/1998 | Cahill | 6,415,574 | B2 | 7/2002 | Beck |
| 5,759,695 | A | 6/1998 | Primeaux | 6,421,973 | B1 | 7/2002 | Gregg et al. |
| 5,768,841 | A | 6/1998 | Swartz et al. | 6,423,167 | B1 | 7/2002 | Palmer et al. |
| 5,791,109 | A | 8/1998 | Lehnert et al. | 6,423,168 | B1 * | 7/2002 | Valiulis .................... 156/226 |
| 5,795,654 | A | 8/1998 | Koishi et al. | 6,425,218 | B1 | 7/2002 | Doyon et al. |
| 5,802,790 | A | 9/1998 | Lamont et al. | 6,430,885 | B1 | 8/2002 | Ito et al. |
| 5,817,262 | A | 10/1998 | Englert et al. | 6,488,792 | B2 | 12/2002 | Mathieu et al. |
| 5,842,280 | A | 12/1998 | Robell | 6,510,667 | B1 | 1/2003 | Cottier et al. |
| 5,848,508 | A | 12/1998 | Albrecht | 6,514,624 | B2 | 2/2003 | Takemoto et al. |
| 5,848,509 | A | 12/1998 | Knapp et al. | 6,516,580 | B1 | 2/2003 | Maietta |
| 5,855,977 | A | 1/1999 | Fukushi et al. | 6,526,717 | B2 | 3/2003 | Waggoner et al. |
| 5,857,303 | A | 1/1999 | Beck et al. | 6,539,643 | B1 | 4/2003 | Gleeson |
| 5,861,211 | A | 1/1999 | Thakkar et al. | 6,550,203 | B1 | 4/2003 | Little |
| 5,863,657 | A | 1/1999 | Kawashima et al. | 6,550,210 | B1 | 4/2003 | Levine et al. |
| 5,878,543 | A | 3/1999 | Mowery | 6,551,694 | B1 | 4/2003 | Imamichi et al. |
| 5,887,403 | A | 3/1999 | Beck | 6,562,444 | B1 | 5/2003 | Gleeson et al. |
| 5,891,374 | A | 4/1999 | Shah et al. | 6,572,697 | B2 | 6/2003 | Gleeson et al. |
| 5,891,516 | A | 4/1999 | Gstrein et al. | 6,599,599 | B1 | 7/2003 | Buckwater et al. |
| 5,908,704 | A | 6/1999 | Friedman et al. | 6,610,358 | B1 | 8/2003 | Williams et al. |
| 5,916,095 | A | 6/1999 | Tamlyn | 6,623,805 | B2 | 9/2003 | Caroline et al. |
| 5,924,213 | A | 7/1999 | Lee | 6,626,947 | B2 | 9/2003 | Lester et al. |
| 5,928,777 | A | 7/1999 | Cox et al. | 6,676,745 | B2 | 1/2004 | Merkley et al. |
| 5,935,699 | A | 8/1999 | Barber | 6,679,011 | B2 | 1/2004 | Beck et al. |
| 5,945,208 | A | 8/1999 | Richards et al. | 6,689,451 | B1 | 2/2004 | Peng et al. |
| 5,946,870 | A | 9/1999 | Bifano et al. | 6,699,576 | B2 | 3/2004 | Peng et al. |
| 5,946,876 | A | 9/1999 | Grace, Sr. et al. | D489,137 | S | 4/2004 | Eichner et al. |
| 5,950,319 | A | 9/1999 | Harris | D489,463 | S | 5/2004 | Barnett |
| 5,968,257 | A | 10/1999 | Ahrens | 6,737,008 | B2 | 5/2004 | Gilbert et al. |
| 5,979,135 | A | 11/1999 | Reeves | D492,424 | S | 6/2004 | Barnett |
| 5,987,838 | A | 11/1999 | Beck | 6,760,978 | B2 | 7/2004 | Gleeson |
| 6,000,185 | A | 12/1999 | Beck et al. | 6,901,713 | B2 | 6/2005 | Axsom |
| 6,012,255 | A | 1/2000 | Smid et al. | 6,913,819 | B2 | 7/2005 | Wallner |
| 6,018,924 | A | 2/2000 | Tamlyn | 6,941,720 | B2 | 9/2005 | DeFord et al. |
| 6,020,429 | A | 2/2000 | Yang et al. | 6,949,160 | B2 | 9/2005 | Weiss et al. |
| 6,026,616 | A | 2/2000 | Gibson | D517,226 | S | 3/2006 | Zarb |
| 6,029,415 | A | 2/2000 | Culpepper et al. | D517,703 | S | 3/2006 | Zarb |
| 6,030,447 | A | 2/2000 | Naji et al. | D518,186 | S | 3/2006 | Zarb |
| 6,045,922 | A | 4/2000 | Janssen et al. | D518,579 | S | 4/2006 | Zarb |
| 6,046,269 | A | 4/2000 | Nass et al. | 7,028,436 | B2 | 4/2006 | Bezubic, Jr. |
| 6,049,987 | A | 4/2000 | Robell | D521,657 | S | 5/2006 | Zarb |
| 6,055,787 | A | 5/2000 | Gerhaher | D524,454 | S | 7/2006 | Zarb |
| 6,063,856 | A | 5/2000 | Mass | 7,089,709 | B2 | 8/2006 | Waggoner et al. |
| 6,079,175 | A | 6/2000 | Clear | D528,669 | S | 9/2006 | Zarb |
| 6,083,335 | A | 7/2000 | Scullin et al. | D529,629 | S | 10/2006 | Zarb |
| 6,084,011 | A | 7/2000 | Lucero et al. | D529,630 | S | 10/2006 | Zarb |
| 6,093,473 | A | 7/2000 | Min | D529,633 | S | 10/2006 | Zarb |
| 6,110,525 | A | 8/2000 | Stoddard | 7,191,570 | B1 | 3/2007 | Eaton et al. |
| 6,122,876 | A | 9/2000 | Bado et al. | 7,323,076 | B2 | 1/2008 | Peng et al. |
| 6,122,877 | A | 9/2000 | Hendrickson et al. | 7,325,325 | B2 | 2/2008 | Gleeson |
| 6,124,044 | A | 9/2000 | Swidler | 2001/0047741 | A1 | 12/2001 | Gleeson et al. |
| 6,134,855 | A | 10/2000 | Beck | 2002/0100249 | A1 | 8/2002 | Peng et al. |
| 6,138,430 | A | 10/2000 | Van Acoleyen et al. | 2002/0139082 | A1 | 10/2002 | DeFord et al. |
| 6,139,620 | A | 10/2000 | Suzuki et al. | 2002/0169271 | A1 | 11/2002 | Peng |
| 6,145,255 | A | 11/2000 | Allaster | 2002/0195191 | A1 * | 12/2002 | Weiss et al. .................... 156/247 |
| 6,161,353 | A | 12/2000 | Negola et al. | 2003/0046891 | A1 | 3/2003 | Colada et al. |
| 6,161,354 | A | 12/2000 | Gilbert et al. | 2003/0054123 | A1 | 3/2003 | Black et al. |

| | | | |
|---|---|---|---|
| 2003/0056458 A1 | 3/2003 | Black et al. | |
| 2003/0089061 A1 | 5/2003 | DeFord et al. | |
| 2003/0172606 A1 | 9/2003 | Anderson | |
| 2003/0200721 A1 | 10/2003 | Gleeson et al. | |
| 2004/0086676 A1 | 5/2004 | Peng | |
| 2004/0103610 A1 | 6/2004 | Axsom | |
| 2004/0163331 A1 | 8/2004 | Peng et al. | |
| 2005/0000172 A1 | 1/2005 | Anderson | |
| 2005/0138865 A1 | 6/2005 | Gleeson et al. | |
| 2005/0210790 A1 | 9/2005 | Wallner | |
| 2005/0262799 A1 | 12/2005 | Gleeson et al. | |
| 2005/0284339 A1 | 12/2005 | Brunton et al. | |
| 2006/0010800 A1 | 1/2006 | Bezubic, Jr. | |
| 2007/0196611 A1 | 8/2007 | Chen et al. | |

FOREIGN PATENT DOCUMENTS

| | | |
|---|---|---|
| AU | 70389/81 | 10/1981 |
| AU | 8401582 | 2/1983 |
| AU | 88589/82 | 3/1983 |
| AU | 94035 S | 11/1986 |
| AU | 95878 S | 3/1987 |
| AU | 98800 S | 12/1987 |
| AU | 99683 S | 2/1988 |
| AU | 102662 S | 1/1989 |
| AU | 103840 S | 5/1989 |
| AU | 104552 S | 8/1989 |
| AU | 46878/89 | 7/1990 |
| AU | 108078 S | 7/1990 |
| AU | 616088 | 7/1990 |
| AU | 110320 S | 2/1991 |
| AU | 643726 | 8/1991 |
| AU | B-7620/91 | 6/1992 |
| AU | B-76201/91 | 6/1992 |
| AU | 199215903 | 4/1993 |
| AU | 117138 S | 5/1993 |
| AU | 118448 S | 10/1993 |
| AU | 118862 S | 11/1993 |
| AU | 686135 | 11/1994 |
| AU | 677649 | 12/1994 |
| AU | 122634 S | 2/1995 |
| AU | 123141 S | 4/1995 |
| AU | 123142 S | 4/1995 |
| AU | 681049 | 9/1996 |
| AU | A-52126/96 | 11/1996 |
| AU | 130941 S | 8/1997 |
| AU | 132812 S | 2/1998 |
| AU | 732998 | 5/1998 |
| AU | 6292698 | 8/1998 |
| AU | 135097 S | 9/1998 |
| AU | 135557 S | 11/1998 |
| AU | 137291 S | 5/1999 |
| AU | 9768198 | 5/1999 |
| AU | 199886116 | 5/1999 |
| AU | 137791 S | 7/1999 |
| AU | 99/26061 | 9/1999 |
| AU | 99/52711 | 3/2000 |
| AU | 140607 S | 5/2000 |
| AU | 00/78752 | 4/2001 |
| AU | 00/78753 | 4/2001 |
| AU | 00/78733 | 5/2001 |
| AU | 200111200 B2 | 5/2001 |
| AU | 01/21275 | 6/2001 |
| AU | 783430 | 6/2001 |
| AU | 200072012 | 6/2001 |
| AU | 735352 | 7/2001 |
| AU | 37683/01 | 9/2001 |
| AU | 01/43991 | 10/2001 |
| AU | 00/53659 | 3/2002 |
| AU | 147568 S | 4/2002 |
| AU | 2001287356 | 4/2002 |
| AU | 148485 S | 7/2002 |
| AU | 200223229 A1 | 11/2002 |
| AU | 2002301041 A1 | 6/2003 |
| AU | 2002301511 A1 | 6/2003 |
| AU | 2003204739 | 7/2003 |
| AU | 152915 S | 8/2003 |
| AU | 2003268882 A1 | 8/2003 |
| AU | 153491 S | 10/2003 |
| AU | 153493 S | 10/2003 |
| AU | 153494 S | 10/2003 |
| AU | 153495 S | 10/2003 |
| AU | 153496 S | 10/2003 |
| AU | 2003204418 | 12/2003 |
| AU | 2003238481 | 12/2003 |
| AU | 2003256630 B2 | 2/2004 |
| AU | 2003257906 | 7/2004 |
| AU | 2003271286 A1 | 7/2004 |
| AU | 2004204092 | 7/2004 |
| AU | 2004101018 | 12/2004 |
| AU | 2004200339 | 6/2005 |
| AU | 2004233526 | 6/2005 |
| AU | 2001250832 | 4/2006 |
| AU | 2002211394 | 4/2006 |
| AU | 2002218649 | 4/2006 |
| AU | 2003266828 | 4/2006 |
| CA | 730345 A | 3/1966 |
| CA | 1080601 | 7/1980 |
| CA | 1084230 | 8/1980 |
| CA | 2313456 | 6/1999 |
| CH | 368918 | 4/1963 |
| CH | 606674 | 11/1978 |
| CH | 678882 | 11/1991 |
| CH | 684285 | 8/1994 |
| CN | 1081168 | 1/1994 |
| CN | 2281378 | 5/1998 |
| DE | 1952082 | 12/1966 |
| DE | 2460879 | 6/1976 |
| DE | 2460880 | 6/1976 |
| DE | 2610998 | 9/1977 |
| DE | 3210326 | 9/1983 |
| DE | 3232106 | 3/1984 |
| DE | 3505335 | 8/1986 |
| DE | 3621010 | 1/1988 |
| DE | 3932176 | 6/1990 |
| DE | 3923800 | 1/1991 |
| DE | 4004103 | 8/1991 |
| DE | 4104919 | 8/1992 |
| DE | 4209834 | 9/1993 |
| DE | 4228338 | 10/1993 |
| DE | 9403018 | 5/1994 |
| DE | 19858342 | 2/2000 |
| DE | 20006112 | 7/2000 |
| DE | 19549535 | 1/2001 |
| DE | 19938806 A1 | 2/2001 |
| EP | 0055504 | 7/1982 |
| EP | 0103097 | 3/1984 |
| EP | 0173553 | 3/1986 |
| EP | 0184477 | 6/1986 |
| EP | 0220073 | 4/1987 |
| EP | 0222339 | 5/1987 |
| EP | 0305209 | 3/1989 |
| EP | 0347092 | 12/1989 |
| EP | 0428431 | 5/1991 |
| EP | 0430667 | 6/1991 |
| EP | 0482810 | 4/1992 |
| EP | 0484283 | 5/1992 |
| EP | 0558239 | 9/1993 |
| EP | 0564447 | 10/1993 |
| EP | 0625618 | 11/1994 |
| EP | 0683282 | 11/1995 |
| EP | 0708213 | 4/1996 |
| EP | 0686501 A1 | 3/1999 |
| EP | 0827563 B1 | 11/1999 |
| EP | 1094165 A2 | 4/2001 |
| EP | 03764818.5-2124 | 12/2006 |
| FR | 990242 | 9/1951 |
| FR | 2248246 | 5/1975 |
| FR | 2405908 | 5/1979 |
| FR | 2451428 | 11/1980 |
| FR | 2540160 | 8/1984 |
| FR | 2562591 | 10/1985 |
| FR | 2624870 | 6/1989 |
| FR | 2628775 | 9/1989 |
| FR | 2702790 | 9/1994 |
| GB | 119182 | 9/1918 |
| GB | 558239 | 12/1943 |
| GB | 558584 | 1/1944 |
| GB | 564447 | 9/1944 |

| | | | | | |
|---|---|---|---|---|---|
| GB | 1086311 | 10/1967 | JP | 08012450 | 1/1996 |
| GB | 1125825 | 9/1968 | JP | 08068184 | 3/1996 |
| GB | 1174902 | 12/1969 | JP | 08074377 | 3/1996 |
| GB | 1269357 | 4/1972 | JP | 2507028 | 5/1996 |
| GB | 1512084 | 5/1978 | JP | 08-151246 | 6/1996 |
| GB | 2021186 | 11/1979 | JP | 08175859 | 7/1996 |
| GB | 2041384 | 9/1980 | JP | 08217561 | 8/1996 |
| GB | 1577648 | 10/1980 | JP | 2538120 | 3/1997 |
| GB | 2064989 | 6/1981 | JP | 09-123340 | 5/1997 |
| GB | 2067622 | 7/1981 | JP | 09-123692 | 5/1997 |
| GB | 2075079 | 11/1981 | JP | 09-193120 | 7/1997 |
| GB | 2078611 | 1/1982 | JP | 2714135 | 10/1997 |
| GB | 2080851 | 2/1982 | JP | 09-296560 | 11/1997 |
| GB | 2083512 | 3/1982 | JP | 10025841 | 1/1998 |
| GB | 2148871 | 6/1985 | JP | 10-044329 | 2/1998 |
| GB | 2199857 | 7/1988 | JP | 10046741 | 2/1998 |
| GB | 2252987 | 8/1992 | JP | 10-121693 | 5/1998 |
| GB | 2340071 | 2/2000 | JP | 10-168199 | 6/1998 |
| JP | 49-116445 | 2/1973 | JP | 10-245925 | 9/1998 |
| JP | 49-46761 | 12/1974 | JP | 10299218 | 11/1998 |
| JP | 51-23229 | 6/1976 | JP | 11050591 | 2/1999 |
| JP | 52051719 | 4/1977 | JP | 11050591 A | 2/1999 |
| JP | 52052429 | 4/1977 | JP | 11050591 A | 2/1999 |
| JP | 53050229 | 5/1978 | JP | 11-210203 | 8/1999 |
| JP | 54123129 | 9/1979 | JP | 11-217918 | 8/1999 |
| JP | 56-130832 | 3/1980 | JP | 11-511110 | 9/1999 |
| JP | 55-116684 | 9/1980 | JP | 11241448 | 9/1999 |
| JP | 56048413 | 5/1981 | JP | 11247307 | 9/1999 |
| JP | 57-058615 | 4/1982 | JP | 11256683 | 9/1999 |
| JP | 57-156541 | 9/1982 | JP | 11-280172 | 10/1999 |
| JP | 5641881 | 9/1982 | JP | 2000-008581 | 1/2000 |
| JP | 58045008 | 3/1983 | JP | 2000-043196 | 2/2000 |
| JP | 58059803 | 4/1983 | JP | 2000064554 | 2/2000 |
| JP | 60-242242 | 2/1985 | JP | 2000-110272 | 4/2000 |
| JP | 58-202823 | 7/1985 | JP | 2000154612 | 6/2000 |
| JP | 60-105715 | 7/1985 | JP | 2000179104 | 6/2000 |
| JP | 61137634 | 6/1986 | JP | 2000-290630 | 10/2000 |
| JP | 61137634 | 8/1986 | JP | 2000-302522 | 10/2000 |
| JP | 61-68967 | 9/1986 | JP | 2001336230 | 12/2001 |
| JP | 037444/1987 | 2/1987 | JP | 2002047750 | 2/2002 |
| JP | 63117939 | 5/1988 | JP | 2002097732 | 4/2002 |
| JP | 63-31426 | 6/1988 | JP | 2002161623 | 6/2002 |
| JP | 63-19636 | 9/1988 | JP | 2002354091 | 12/2002 |
| JP | 63257631 | 10/1988 | JP | 2002364091 | 12/2002 |
| JP | 63-47229 | 12/1988 | JP | 2004027497 | 1/2004 |
| JP | 64-20910 | 1/1989 | KR | 1992-8773 | 10/1992 |
| JP | 64-22385 | 1/1989 | KR | 1994-0006957 | 4/1994 |
| JP | 64-25200 | 1/1989 | KR | 1019967005677 | 11/1996 |
| JP | 64-50541 | 3/1989 | KR | 200158855 | 5/1998 |
| JP | 01128748 | 5/1989 | KR | 100231910 | 9/1999 |
| JP | 1178658 | 7/1989 | KR | 200172372 | 12/1999 |
| JP | 02192447 | 7/1990 | KR | 100274218 | 9/2000 |
| JP | 2204566 | 8/1990 | NO | 9901129 | 9/2000 |
| JP | 02-236350 | 9/1990 | NZ | 19354 | 9/1984 |
| JP | 3-4654 | 2/1991 | NZ | 210395 | 11/1984 |
| JP | 03-128912 | 5/1991 | NZ | 211265 | 2/1985 |
| JP | 3-63641 | 6/1991 | NZ | 20119 | 10/1985 |
| JP | 3-66338 | 6/1991 | NZ | 20120 | 10/1985 |
| JP | 04089340 | 3/1992 | NZ | 20844 | 11/1986 |
| JP | 4149352 | 5/1992 | NZ | 218315 | 2/1987 |
| JP | 04295072 | 10/1992 | NZ | 21875 | 4/1988 |
| JP | 04300232 | 10/1992 | NZ | 22705 | 7/1989 |
| JP | 5-1532 | 1/1993 | NZ | 240533 | 11/1991 |
| JP | 044323 | 2/1993 | NZ | 240533 | 11/1991 |
| JP | 058215/1991 | 2/1993 | NZ | 221389 | 12/1991 |
| JP | 5-24768 | 3/1993 | NZ | 242960 | 5/1992 |
| JP | 05-057786 | 3/1993 | NZ | 242960 | 5/1992 |
| JP | 524768 | 3/1993 | NZ | 25267 | 6/1993 |
| JP | 565760 | 3/1993 | NZ | 248942 | 10/1993 |
| JP | 05-040473 | 6/1993 | NZ | 230209 | 12/1993 |
| JP | 5-42192 | 10/1993 | NZ | 247463 | 12/1993 |
| JP | 06-017621 | 1/1994 | NZ | 25838 | 4/1994 |
| JP | 6023889 | 2/1994 | NZ | 26065 | 7/1994 |
| JP | 6-28563 | 3/1994 | NZ | 26066 | 7/1994 |
| JP | 06-080264 | 3/1994 | NZ | 306382 | 5/1996 |
| JP | 06123158 | 5/1994 | NZ | 240533 | 7/1996 |
| JP | 06278116 | 10/1994 | NZ | 270310 | 12/1996 |
| JP | 7232975 | 9/1995 | NZ | 280409 | 6/1997 |
| JP | 7232975 A | 9/1995 | NZ | 280235 | 9/1997 |

| | | |
|---|---|---|
| NZ | 259493 | 10/1997 |
| NZ | 242960 | 12/1997 |
| NZ | 314544 | 6/1998 |
| NZ | 504881 | 10/1998 |
| NZ | 334918 | 3/1999 |
| NZ | 336159 | 6/1999 |
| NZ | 331336 | 10/1999 |
| NZ | 512028 | 11/1999 |
| NZ | 502004 | 12/1999 |
| NZ | 331553 | 1/2000 |
| NZ | 334899 | 4/2000 |
| NZ | 400643 | 4/2000 |
| NZ | 505799 | 7/2000 |
| NZ | 507846 | 10/2000 |
| NZ | 508055 | 11/2000 |
| NZ | 335529 | 12/2000 |
| NZ | 502017 | 12/2000 |
| NZ | 500215 | 5/2001 |
| NZ | 516912 | 1/2002 |
| NZ | 517658 | 3/2002 |
| NZ | 524520 | 9/2003 |
| NZ | 518988 | 10/2003 |
| NZ | 520286 | 3/2004 |
| NZ | 521491 | 6/2004 |
| NZ | 525507 | 9/2004 |
| NZ | 525328 | 2/2005 |
| NZ | 528304 | 4/2005 |
| NZ | 530605 | 6/2005 |
| NZ | 532182 | 12/2005 |
| NZ | 536129 | 2/2006 |
| PL | 106840 | 1/1999 |
| PL | P-339671 | 1/2001 |
| SG | 93908341 | 4/1989 |
| SG | 92906122 | 8/1989 |
| SG | 97920847 | 11/1990 |
| SG | 97912869 | 4/1993 |
| SG | 95012084 | 1/1994 |
| SG | 96026257 | 4/1994 |
| SG | 96120035 | 4/1995 |
| SG | 97059547 | 5/1996 |
| SG | 98021017 | 9/1996 |
| SG | 98021751 | 9/1996 |
| SG | 98051485 | 2/1997 |
| SG | 97018402 | 5/1997 |
| SG | 98012917 | 6/1997 |
| SG | 99017030 | 10/1997 |
| SG | 00235 | 2/2007 |
| SG | 99235 | 2/2007 |
| SU | 587123 | 1/1978 |
| SU | 607813 | 5/1978 |
| SU | 655678 | 4/1979 |
| SU | 1114646 | 9/1984 |
| SU | 1606633 | 11/1990 |
| TW | 282800 | 9/1986 |
| TW | 278536 | 6/1996 |
| TW | 278537 | 6/1996 |
| TW | 150027 | 2/2001 |
| TW | 255851 | 6/2006 |
| WO | WO 81/02758 | 10/1981 |
| WO | WO 85/03966 | 9/1985 |
| WO | WO 90/08240 | 7/1990 |
| WO | WO 91/11321 | 8/1991 |
| WO | WO 91/14057 | 9/1991 |
| WO | WO 9114058 | 9/1991 |
| WO | WO 92/00927 | 1/1992 |
| WO | WO 92/17657 | 10/1992 |
| WO | WO 93/06316 | 4/1993 |
| WO | WO 93/12303 | 6/1993 |
| WO | WO 93/21126 | 10/1993 |
| WO | WO 93/24711 | 12/1993 |
| WO | WO 94/19561 | 9/1994 |
| WO | WO 95/11357 A1 | 4/1995 |
| WO | WO 95/26450 | 10/1995 |
| WO | WO 96/14482 | 5/1996 |
| WO | WO 97/07968 | 3/1997 |
| WO | WO 97/08111 | 3/1997 |
| WO | WO 97/08401 | 3/1997 |
| WO | WO 97/19810 A1 | 6/1997 |
| WO | WO 97/23696 | 7/1997 |
| WO | WO 97/28342 | 8/1997 |
| WO | WO 98/10151 | 3/1998 |
| WO | WO 98/16697 | 4/1998 |
| WO | WO 98/32713 | 7/1998 |
| WO | WO 98/45222 | 10/1998 |
| WO | WO 99/10607 | 3/1999 |
| WO | WO 99/13185 | 3/1999 |
| WO | WO 99/22095 | 5/1999 |
| WO | WO 99/31158 | 6/1999 |
| WO | WO 99/43904 | 9/1999 |
| WO | WO 99/64692 | 12/1999 |
| WO | WO 00/08271 | 2/2000 |
| WO | WO 00/14354 | 3/2000 |
| WO | WO 00/21901 | 4/2000 |
| WO | WO 00/22032 | 4/2000 |
| WO | WO 00/55446 | 9/2000 |
| WO | WO 00/63506 | 10/2000 |
| WO | WO 00/65166 | 11/2000 |
| WO | WO 01/14277 A2 | 3/2001 |
| WO | WO 01/16048 | 3/2001 |
| WO | WO 01/25561 | 4/2001 |
| WO | WO 01/25562 | 4/2001 |
| WO | WO 01/26894 | 4/2001 |
| WO | WO 01/36191 | 5/2001 |
| WO | WO 01/49952 | 7/2001 |
| WO | WO 01/59228 | 8/2001 |
| WO | WO 01/65021 | 9/2001 |
| WO | WO 01/66485 | 9/2001 |
| WO | WO 01/68547 | 9/2001 |
| WO | WO 01/73239 | 10/2001 |
| WO | WO 02/09663 | 2/2002 |
| WO | WO 02/27109 | 4/2002 |
| WO | WO 02/28795 | 4/2002 |
| WO | WO 02/28796 | 4/2002 |
| WO | WO 02/31287 | 4/2002 |
| WO | WO 02/32830 | 4/2002 |
| WO | WO 02/34508 A1 | 5/2002 |
| WO | WO02/36524 | 5/2002 |
| WO | WO 02/36524 | 5/2002 |
| WO | WO 02/38518 | 5/2002 |
| WO | WO-0234508 | 5/2002 |
| WO | WO 02/055806 | 7/2002 |
| WO | WO 02/081839 | 10/2002 |
| WO | WO 02/081840 | 10/2002 |
| WO | WO 02/081841 | 10/2002 |
| WO | WO 02/081842 | 10/2002 |
| WO | WO 02/096824 | 12/2002 |
| WO | WO 03/106365 | 12/2003 |
| WO | WO 2004/031093 | 4/2004 |
| WO | WO 2004/063113 | 7/2004 |
| WO | WO 2005/003478 | 1/2005 |
| WO | WO 2005/019550 | 3/2005 |
| WO | WO 2005/035900 | 4/2005 |
| WO | WO 2005/052276 | 6/2005 |
| WO | WO 2005/068741 | 7/2005 |
| WO | WO 2005/078210 | 8/2005 |
| WO | WO 2006/039762 | 4/2006 |

OTHER PUBLICATIONS

Australian—International Search Report for AU 2004903567 filed Jun. 29, 2004.
International Search Report dated Feb. 11, 2005 for PCT/AU2004/001672.
First Examination Report dated Feb. 15, 2005; AU Innovation Patent No. 2004101018.
Australian Patent and Design Infringement Search Results in Respect of the Pre-finished Eave System Concept.
New Zealand Patent and Design Infringement Search Results in Respect of the Pre-Finished Eave System Concept.
PCT Rule 66 Written Opinion for International Application No. PCT/US03/22656 filed Aug. 16, 2003.
International Search Report for corresponding International Application No. PCT/US03/22656.
Dupont TEDLAR polyvinyl fluoride film (Adhesive and Lamination Guide for Tedlar PVF Film)—10 pgs.
Dupont TEDLAR polyvinyl fluoride film (Adhesive and Lamination Guide for Tedlar PVF Film)—1 pg.

Zdenek Sauman et al; II Cemento, vol. 3, 1978, pp. 343-350 "influence Explanation of Siliceous Materials Additive to Cement as well as of Pastes Hydration and Their Treatment Temperature on the Lime Quantity Liberated by Rehydration".

Ray A, et al., Thermochimica Acta 250 (1995) pp. 189-195 "Use of DTA to determine the Effect of Mineralizers on the Cement-Quartz Hydrothermal Reactions."

de Silva P.S. et al. Adv. In Cem. Res. (1990), vol. 3, No. 12, October, pp. 167-177, "Hydration of Cements Based on Metakaolin: Thermochemistry".

Ambriose J. et al; Int. Congress GRC/87, 6th Biennial Congress of the GRCA, Oct. 20-23, 1987 Edinburgh, Scotland, pp. 19-24, "Metakaoline Blended Cements: An Efficient Way to Improve GRC Durability and Ductility".

Kuder, et al. "Extruded Fiber-Reinforced Composites for Building Enclosures" NSF Housing Research Agenda Workshop: Proceedings and Recommendations, Orlando, FL; Feb. 12-14, 2004, pp. 222-231.

Letter from Sargent & Krahn dated Jan. 31, 2005 reporting First Substantive Report for Chilean Patent Application No. 655-2002 dated Mar. 4, 2002, which claims priority to U.S. Appl. No. 60/281,195, filed Apr. 3, 2001.

Letter from Sargent & Krahn dated Apr. 1, 2005 reporting First Substantive Report for Chilean Patent Application No. 653-2002 dated Mar. 4, 2002, which claims priority to U.S. Appl. No. 60/281,195, filed Apr. 3, 2001.

CSR RendaLine—External Wall Cladding System—Brochure, Jan. 2002.

EPS Plaster Cladding Systems Technical and Installation Manual, Rockcote Architectural Coatings (NZ) Limited, Mar. 2003.

STOANZ Trade literature, Nov. 2003.

STOANZ Trade literature, Jan. To May 2004.

PBS Distributors Ltd trade literature relating to Vent-Clad cladding system, Aug. 2003.

Plaster Systems, Ltd., "Insulclad cavity based exterior plaster cladding system specification," Feb. 2004.

Plaster Systems, Ltd., "Insulclad cavity based exterior plaster cladding system specification," Oct. 2003.

Department of Building and Housing, "Compliance Document for NZ Bldg Code Clause E2," 2005.

James Hardie article, "External Wall Cladding," Oct. 1990 (2 pgs).

James Hardie article, "Primeline Weatherboards," Oct. 1996 (8 pgs).

HARDIHOME Lap Siding with the Embossed EZ Line Alignment Aid, Mar. 2000.

Kuroki et al., "Cement-Bonded Board Industry and Market in Japan and New Technology Developments," 1995.

BGC Fibre Cement "Ceramic Tile Floor Underlay" Apr. 2002, (7 pgs.).

Gypsum Association Manual, 14th Edition 1994, p. 33-34.

J.E. Mark, Applied Polymer Science 21st Century, pp. 209-222 (Clara D. Craver and Charles E. Carraher, Jr. ed., Elsevier 2000).

Hawley's Condensed Chemical Dictionary, Fourteenth Edition, Revised by Richard J. Lewis, Sr., published by John Wiley & Sons, Inc. pp. 447, 624, 903-904 (date unknown).

Database WPI, Section Ch, Week 1977, 23, Derwent Publications Ltd., London, GB, XP002159268.

Database WPI, Section Ch, Week 1977, 23, Derwent Publications Ltd., London, GB, XP002159269.

PCA (Portland Cement Assoc) article: "Concrete Homes—Fiber Cement Siding" (3 pgs).

New Zealand Department of Building and Housing, "Non-flush finished joints," Jul. 1, 2005, Acceptable Solution E2/AS1 (extract from the New Zealand Building Code) 1 pg).

Notification of First Office Action for Chinese Patent Application No. 00815911.4 dated Sep. 24, 2004.

Notification of First Office Action for Chinese Patent Application No. 02811074.9 dated Feb. 4, 2005.

Notification of First Office Action for Chinese Patent Application No. 02811237.7 dated Mar. 18, 2005.

Notification of First Office Action for Chinese Patent Application No. 02811168.0 dated Mar. 18, 2005.

Chilean patent application 170-97 (S. Ind. Pizarreno, Dec. 5, 1997).

Chilean patent application 2673-97 (S. Ind. Pizarreno, Jan. 30, 1997).

Letter from Sargent & Krahn dated Apr. 11, 2005 reporting First Substantive Report for Chilean Patent Application No. 656-2002 dated Mar. 4, 2002, which claims priority to U.S. Appl. No. 60/281,195, filed Apr. 3, 2001.

Written Opinion of the International Searching Authority for PCT/US2004/019980 dated Dec. 20, 2005.

International Preliminary Examination Report for PCT/US00/27451 dated Dec. 7, 2001.

International Search Report for PCT/US00/27451 dated Feb. 2, 2001.

International Preliminary Examination Report for Application PCT/US00/31729 dated Feb. 21, 2002.

International Search Report for PCT/US00/31729 dated Feb. 21, 2001.

International Search Report for PCT/AU00/00320 dated May 31, 2000.

International Search Report for PCT/US 02/10760 dated Aug. 5, 2002.

International Preliminary Examination Report for Application PCT/US02/10760 dated Feb. 3, 2003.

International Search Report for PCT/US 02/10610 dated Aug. 5, 2002.

International Preliminary Examination Report for Application PCTS/US02/10610 dated Feb. 7, 2003.

International Search Report for PCT/US 02/10608 dated Aug. 5, 2002.

International Preliminary Examination Report for Application PCT/US02/10608 dated Feb. 14, 2003.

International Search Report for Application PCT/US02/10609 dated Aug. 1, 2002.

International Search Report for PCT/US 02-10609 dated Aug. 7, 2002.

International Preliminary Examination Report for Application PCT/US02/10609 dated Apr. 22, 2003.

International Search Report for PCT/US2004/019980 dated Sep. 15, 2004.

International Preliminary Examination Report for Application PCT/US04/19980 dated Jul. 27, 2005.

International Preliminary Examination Report for Application PCT/US01/10908 dated Apr. 6, 2002.

International Search Report for PCT/US01/01908 dated Mar. 19, 2001.

International Search Report for PCT/AU97/00692 dated Dec. 3, 1997.

Examination Report for European Patent Application No. 00980518.5 dated Jan. 5, 2005).

Notice of Opposition of Chilean patent application No. 653-2002.

Notice of Opposition of Chilean patent application No. 655-2002.

Notice of Opposition of Chilean patent application No. 656-2002.

Notice of Opposition of Chilean patent application No. 654-2002.

Translation of Taiwanese Patent Office Decision of Appeal and Opposition (App.#85114421).

Supplemental European Search Report (EP 97943673) dated Mar. 27, 2001.

International Search Report for AU 2004903567, filed Jun. 29, 2004.

International Search Report for PCT/IB2005/050709 dated May 23, 2005.

International Preliminary Report for PCT/IB2005/050709 dated Dec. 22, 2005.

Applications from CHP family chart.

Office Action mailed Jul. 13, 2007 in U.S. Appl. No. 10/117,401.

Office Action mailed Dec. 12, 2006 in U.S. Appl. No. 10/117,401.

Office Action mailed Mar. 27, 2006 in U.S. Appl. No. 10/117,401.

Office Action mailed Oct. 5, 2005 in U.S. Appl. No. 10/117,401.

Office Action mailed Mar. 14, 2005 in U.S. Appl. No. 10/117,401.

Office Action mailed Aug. 25, 2004 in U.S. Appl. No. 10/117,401.

Office Action mailed Nov. 3, 2003 in U.S. Appl. No. 10/117,401.

Two EPO Examination Reports in copending Application No. 02-719-436.6.

Decision to Grant a Patent and an Examination Report for copending Japanese Application No. 2002-579593.

Examiner's First Report for copending Australian Patent Application No. 2002250516 dated Dec. 14, 2006.

Examination Reports in copending Chilean Application No. 656-02 (dated 2005 and 2006).
Notice of Registration and two Office Actions in copending China Application No. 02811237.7.
Decision to Grant for Patent and Preliminary Notice of Objection in copending Korean Application No. 10-2003-7013036.
Letters Patent for Copending New Zealand Patent No. 528779.
Certificate of Grant of Patent in Copending Singapore Patent Application No. 200305728-8.
IA (NZ) Consultation Document, "Proposed Change to Building Code Clause E2 External Moisture" (Jun. 13, 2003).
James Hardie, "Hardiglaze wet area linings", Product brochure, published May 1999, p. 18.
PCT International Preliminary Examination Report for International Application No. PCT/US03/22656 dated Aug. 23, 2004.
Derwent Acc No. 1981-00856D for FR 2451428, published Nov. 14, 1980.
Machine translation for FR 2451428.
Machine translation for JP 2714135.
Translation of application JP 48-15522 for publication JP 49-116445.
Translation of application JP 55-27157 for publication JP 56-130812.
Derwent Acc No. 1991-295696 for WO 91/14058 published Sep. 19, 1991.
Machine translation for KR 1994-0006957.
Third Party Observations filed by Redco for corresponding European patent application EP03764818.5 on Dec. 7, 2006.
EPO Communication pursuant to Art 115(2) EPC dated Dec. 19, 2006 advising applicant of the third party observations filed by Redco.
Redco Third Party Observations: 1: MIRRAL Technical Data Sheets (Enclosures 1-7); Jun. 1993.
Redco Third Party Observations: 4: NOVACEL Brochures (Enclosures 8-10); Oct. 1997.

* cited by examiner

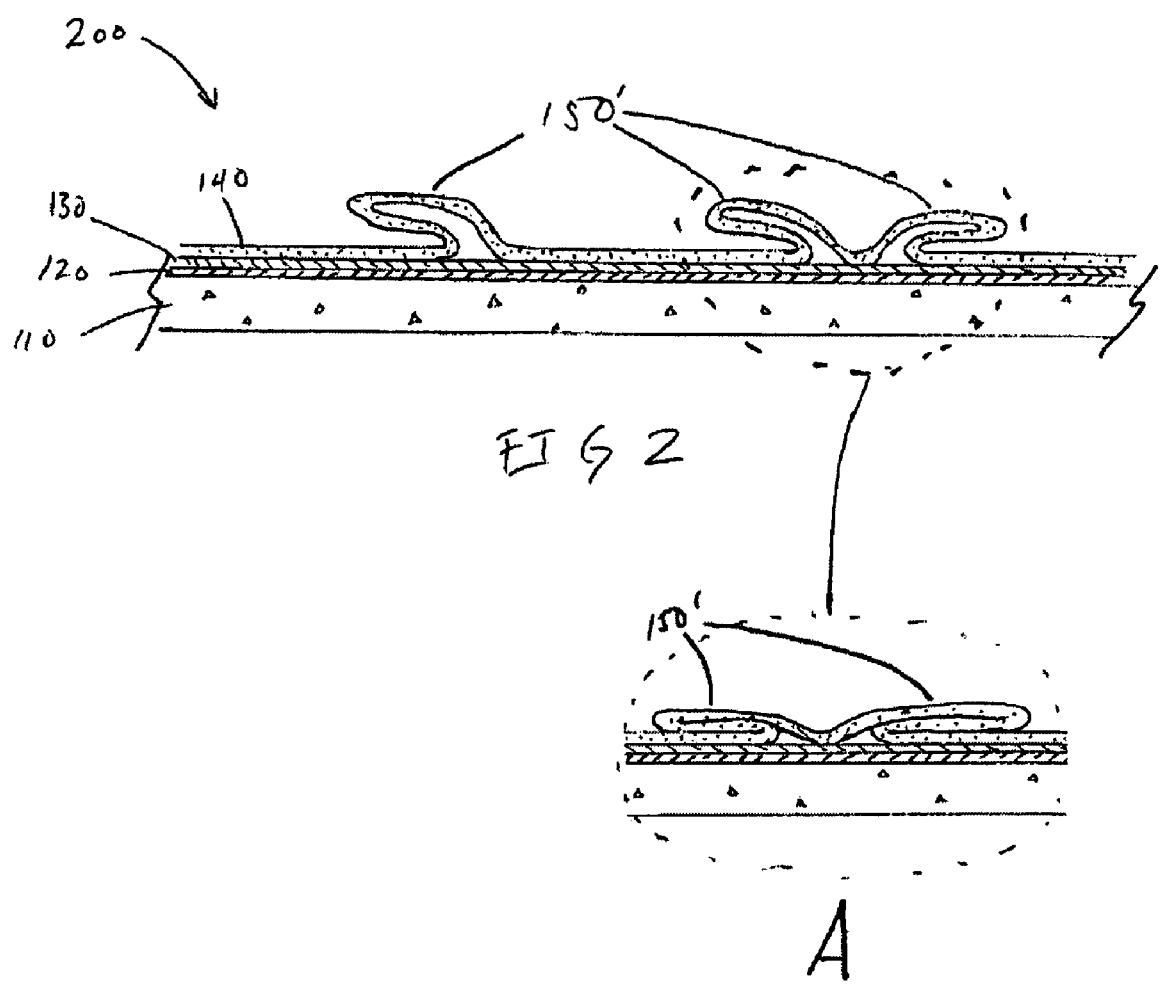

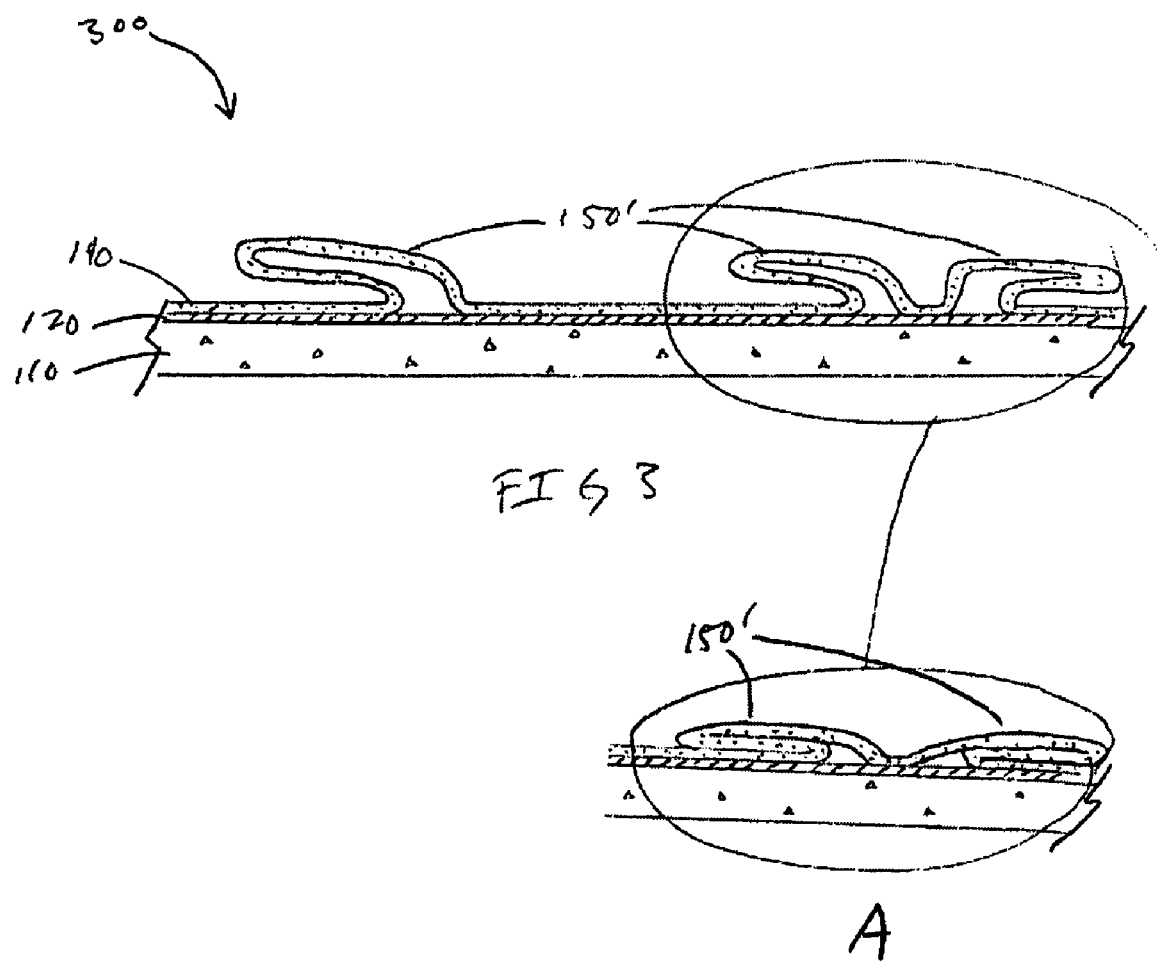

PACKAGING PREFINISHED FIBER CEMENT ARTICLES

RELATED APPLICATIONS

This application is a continuation-in-part of U.S. patent application Ser. No. 10/620,711 filed Jul. 16, 2003 which claims the benefit of U.S. Provisional Application No. 60/396,303, filed Jul. 16, 2002, the disclosure of which is incorporated by reference.

BACKGROUND OF THE INVENTION

1. Field of the Invention

The present application is generally directed to building materials, and more specifically, to the packaging of prefinished fiber cement articles.

2. Description of the Related Art

In the construction industry, building materials are often prefinished with a coating prior to sale and installation. For example, prefinished siding planks and panels are popular because of the labor and time saved during installation; a siding contractor need only install the material on the exterior of a building, and no subsequent finishing, such as priming and painting, is required. Producing prefinished articles can be a boon for manufacturers as well. By finishing building materials before they leave the factory, a manufacturer has complete control over the quality and consistency of the finished article, which ensures that a coating with appropriate performance is applied and that the coating will have a predictable service lifetime.

Traditionally, unfinished siding planks and panels are stacked one atop another on a wood pallet, secured to the pallet with metal or plastic bands and wrapped with plastic or placed in bags to protect the siding from damage by the elements during transport, handling, and storage. Prefinished siding planks typically require additional packaging and protection to maintain the integrity and appearance of the factory-applied coating. In packaging prefinished siding composites such as hardboard or OSB siding, a protective layer of plastic film, foam, or paper between two siding planks or panels has been used to protect the prefinished surface. These protective layers are generally applied without an adhesive. Automated application is less accurate absent an adhesive to anchor the protective layer to the article. Consequently, such protective layers are typically applied manually, which is expensive and limits throughput. Also, loosely applied protective layer often becomes displaced during transportation of the article. Packaging prefinished planks and panels made from fiber cement presents a special problem because the abrasive nature of fiber cement may damage the protective layer and the prefinished article surface during storage, transport, and handling of the fiber cement articles.

In a typical manufacturing operation for fiber cement siding planks, several planks are cut from a single sheet. These planks are then finished and packaged separately such that the finished planks are individually placed back-to-back and front-to-front with a protective layer sandwiched either between planks, or sometimes between those planks stacked front-to-front to protect the prefinished surface. Stacking in this configuration prevents the abrasive backside of the plank or panel from contacting the prefinished front. Stacking planks back-to-back and front-to-front requires a means to flip the planks in the stacking operation, either manually or mechanically, thereby requiring additional labor or a piece of equipment built for this purpose, which adds additional equipment capital, operating, and maintenance costs.

In addition to protecting the prefinished faces of the fiber cement articles, the protective layers, also known as slip sheets, help keep the finished surfaces clean. The protective layers also protect the finished surfaces from damage by dirt and moisture. The protective layer can also be used for inhibiting efflorescence.

Sheet adhesion is affected by the variations of moisture content in finished fiber cement articles and the board surface temperature of finished surface. When using an adhesive to hold the slip sheets in place on the planks, adhesion becomes an important consideration. Too little adhesion results in the slip sheet falling off prematurely while too much adhesion can damage the plank or leave undesirable residue when the slip sheet is removed. With aging or storage, the adhesion changes with variations of moisture content in finished fiber cement articles, variations of the board surface temperature of finished surface, temperature history during storage, moisture history in storage, the UV exposure, the varied stacking pressure, and combined effects from the aforementioned variables. In some cases, the protective layers themselves damage the finished surfaces, for example, changing the glossiness of the finish (e.g., burnishing), changing the color of the finish, residue from protective layer remaining after removal, or removing portions of the finish when the protective layer is removed from the finished surface. A protective layer may also trap undesired moisture against the finished surface.

SUMMARY OF THE INVENTION

Disclosed herein, in one embodiment, is a protected prefinished fiber cement article with a protective layer that protects the finish from damage in storage, transport, and handling. When removed, the protective layer does not leave an adhesive residue on the finish. The protected prefinished fiber cement articles are conveniently stacked on pallets for storage and transport. Also disclosed is a method for manufacturing protected prefinished fiber cement articles. Disclosed is a protective layer with spacers bonded thereto and a method for manufacturing the same.

One embodiment of the disclosed invention provides a protected prefinished fiber cement article comprising a fiber cement article, a finished layer applied to the fiber cement article, and a protective layer adhered to the finished layer with an adhesive. The protective layer protects the finished layer from damage in storage, transport, and handling. Removing the protective layer leaves no residue on the finished layer and does not damage the finished layer.

Another embodiment of the disclosed invention provides a protected prefinished fiber cement article comprising a fiber cement article, a finished layer applied to the fiber cement article, and a protective layer adhered to the finished layer electrostatically and with an adhesive. The layer protects the finished layer from damage in storage, transport, and handling. Upon removal, the protective layer does not leave residue on the finished layer and does not damage the finished layer.

Another embodiment of the disclosed invention provides a protected prefinished fiber cement article comprising a fiber cement article, a finished layer applied to the fiber cement article, and a protective layer adhered to the finished layer electrostatically without use of an adhesive. The layer protects the finished layer from damage in storage. Upon removal, the protective layer does not leave residue on the finished layer and does not damage the finished layer.

Another embodiment of the disclosed invention provides a protected prefinished fiber cement article comprising a fiber cement article, a finished layer applied to the fiber cement article, and a protective layer adhered to the finished layer having a surface treatment, such as Corona, on protective layer with or without use of an adhesive, or surface treatment on finished surface. The protective layer protects the finished layer from damage in storage, transport, and handling. Removing the protective layer leaves no residue on the finished layer and does not damage the finished layer.

Another embodiment of the disclosed invention provides a protective film with UV resistance. The protective film adhered to the pre-finished fiber cement has stable adhesion under UV exposure. This enables the installation of the protected finished fiber cement without removing the protective film immediately. Upon removal of the protective layer, there is no damage to the finished layer. Upon removal, the protective layer does not leave residue on the finished layer and does not damage the finished layer. The protective film can temporarily protect the finished fiber cement article from dust and staining on the construction site.

Another embodiment provides an assembly of protected prefinished fiber cement articles comprising a plurality of protected prefinished fiber cement articles arranged in a stack. A protected prefinished fiber cement article comprises a fiber cement article, a finished layer applied to the fiber cement article, and a protective layer adhered to the finished layer. The protective layer protects the finished layer from damage in storage, transport, and handling. Removing the protective layer leaves no residue on the finished layer and does not damage the finished layer.

Another embodiment provides a method of constructing a building using a protected prefinished fiber cement article. A protected prefinished fiber cement article comprises a fiber cement article, a finished layer applied to the fiber cement article, and a protective layer adhered to the finished layer. The protective layer protects the finished layer from damage in storage, transport, and handling. Removing the protective layer leaves no residue on the finished layer and does not damage the finished layer.

The protective layer is removed and the fiber cement article fastened to a building frame.

Another embodiment provides a protective layer with a spacer bonded thereto used for manufacturing a protected prefinished fiber cement article. A protected prefinished fiber cement article comprises a fiber cement article, a finished layer applied to the fiber cement article, and a protective layer adhered to the finished layer. The protective layer protects the finished layer from damage in storage, transport, and handling. Upon removal, the protective layer does not leave residue on the finished layer and does not damage the finished layer.

The protective layer with a spacer bonded thereto comprises a protective layer and a spacer bonded to a face of the protective layer.

Another embodiment provides a method of manufacturing a protective layer with a spacer bonded thereto used for manufacturing a protected prefinished fiber cement article. A protected prefinished fiber cement article comprises a fiber cement article, a finished layer applied to the fiber cement article, and a protective layer adhered to the finished layer. The protective layer protects the finished layer from damage in storage, transport, and handling. Upon removal, the protective layer does not leave residue on the finished layer and does not damage the finished layer. The method comprises bonding a spacer to a face of a protective layer.

BRIEF DESCRIPTION OF THE DRAWINGS

FIG. 2 illustrates in cross-section an embodiment of the disclosed protected prefinished fiber cement article with an adhesively attached protective layer and folded spacers.

FIG. 3 illustrates in cross-section of an embodiment of the disclosed protected prefinished fiber cement article with an electrostatically attached protective layer and folded spacers.

DETAILED DESCRIPTION OF THE PREFERRED EMBODIMENTS

Figure 1A:
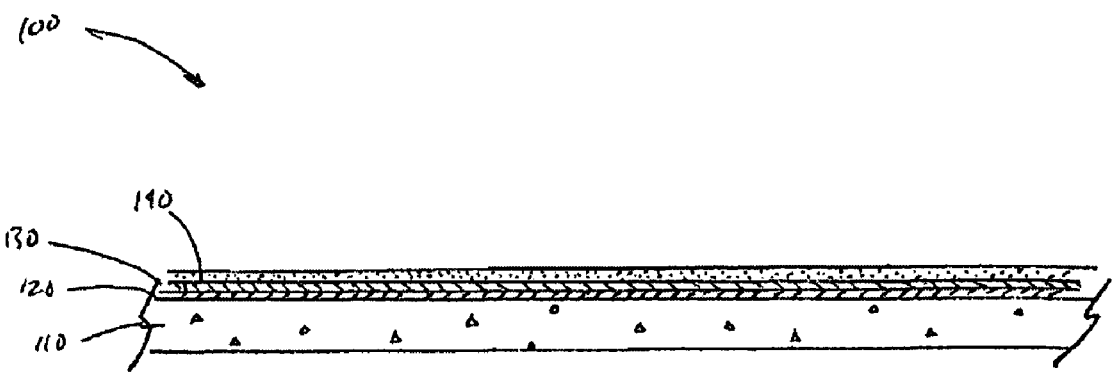
FIG. 1A and FIG. 1B illustrate in cross-section an embodiment of the disclosed protected prefinished fiber cement article with an adhesively attached protective layer and spacers.

Described herein, in one embodiment, is a packaging system used to protect the finish of a prefinished fiber cement article or product from damage in handling, transport, or storage. A method of preparing the packaging system and applying the packaging system to a finished fiber cement article is also described. The term "damage" is used herein in its ordinary meaning, and also with a particular meaning of undesirable changes to the finish, including, for example, changes in the glossiness (e.g., burnishing); changes in the color; removal of a part of the finish (e.g., chips, dents, scratches, and the like); efflorescence; and residue from the packaging system (e.g., adhesive residue).

The disclosed system and method may be used to package prefinished articles made from any suitable material or materials, for example, wood, wood composites, cement, concrete, metals, rubber, rubber composites, polymer resins, polymer composites, and combination thereof. In one exemplary embodiment, the material or substrate is fiber reinforced cement. As an example only, the following discussion will use fiber cement as a preferred substrate. Of course, the technology and inventions disclosed herein may be practiced with alternative substrates and the appended claims should not be limited to any preferred substrate unless expressly limited by the claim language. The term "fiber cement" is used herein in its ordinary meaning, as well as for a material made from fibers and cement. In one embodiment, the fibers are cellulose fibers, derived, for example, from the pulping of wood or synthetic fibers such as polypropylene, polyethylene, and polyvinyl alcohol fibers. The cement is typically Portland cement. Fiber cement may also include other components, for example, density modifiers, additives, aggregate, and water repellants. The fiber cement articles are typically building articles, and include, for example, panels, planks, shingles, soffits, facia, trim pieces, moldings, doors, columns, pilasters, and the like. The fiber cement articles may be smooth, textured, shaped, or perforated.

The protective layer or sheet is selected to protect the finished surfaces of a fiber cement article during handling, transport, and storage. The protective layer may be made from any material that will provide adequate protection, including, paper, polymer resin, polymer foam, and combinations thereof. One preferred material for the protective layer is a polymer film.

The fiber cement article may be finished with any suitable finish. Suitable finishes are well known in the art, for example, water-based paint, solvent-based paint, oil-based paint, or high solid paint; latex-, alkyd-, epoxy-, urethane-, or acrylic-based finishes; or powder coats. The finish may be cured at ambient temperature or at an elevated temperature. In other embodiments, the finish is radiation cured, such as UV-cured or photo-cured. In another embodiment, the finish is laminated to the fiber cement substrate using methods suitable in the art, for example, thermally or with an adhesive.

The finish may be applied in a single layer or coat, or in multiple coats. In multiple coat finishes, each coat may be selected to provide particular performance characteristics. In one embodiment, a primer layer is applied to the fiber cement article, and one or more decorative coats are applied over the primer. The primer typically provides improved adhesion for later-applied finished layers, and may also have additional properties, for example, water repellency or fungicidal activity.

In one embodiment, the topmost coat is pigmented and has a selected surface glossiness. The particular topmost coat may also be selected for other desirable properties, for example, durability, fade resistance, ease of cleaning, or water management.

In another embodiment, the topmost coat is a transparent or translucent coat, which may be a protective coat, and/or provide additional benefits, for example, UV resistance, durability, water resistance, or a desired surface glossiness.

In another embodiment, the finish is a primer coat, which is finished as desired in the field.

The protected fiber cement articles are conveniently stacked for storage and transport. In one embodiment, the protected fiber cement articles are stacked on a pallet. The protected fiber cement articles may be stacked face-to-back without damaging the finished surfaces. In another embodiment, the protected fiber cement articles are stacked face-to-face and/or back-to-back.

The protective layer also protects the finished layer from damage during handling, for example, at a construction site. In the construction of a building, the protected fiber cement article is fastened to a building frame. In one embodiment, the protective layer is removed before fastening the protected fiber cement article to the frame. In another embodiment, the protective layer is removed after fastening the protected fiber cement article to the frame. For example, the protected fiber cement plank may be partially fastened to the frame using two nails partially driven through the plank. The protective layer could then be removed and the nails driven to their final positions. Additional nails may then be used to fully secure the plank. Alternatively, the nails can initially be driven to their final positions and the protective layer subsequently removed.

In another embodiment, the protective film has UV resistance. The protective layer on the pre-finished fiber cement has stable adhesion under UV exposure. The protective layer is pigmented to block UV rays, preferably either black or white. This enables the installation of the protected finished fiber cement without removing the protective layer immediately. The protective layer can temporarily protect the finished fiber cement article from dirt, dust, and staining on the construction site.

One test for determining the protective layer performance and resistance to damage is a peel strength test. Peel strength is a measure of the force required to remove the protective layer. When the peel strength is too low, the protective layer will not adhere to the surface it is trying to protect, therefore, leaving the finished surface susceptible to damage during stacking, transportation, or on the job site. If the peel strength is too high, removal of the protective layer can cause damage to the surface of the finished layer by either removal of the finished surface or residue from the protective layer remaining on the finished surface after removal of the protective layer. A modified ASTM D3330, standard test method for peel adhesion of pressure sensitive tape is used. The test involves using weights to pull on the protective layer until it moves.

Protected pre-finished fiber cement articles could be stored for some time, either at a warehouse or on a construction job site for a considerable amount of time prior to installation on a wall. The peel strength of the protected layer could be affected by such conditions due to storage, such as temperature, pressure, moisture changes, aging, weathering, and other external influences. As the peel strengths increase, so does the possibility of damage to the finished surface of the fiber cement building article. The effects of aging can be simulated by using accelerated aging.

FIG. 1A illustrates a protected fiber cement article 100 according to an embodiment of the present disclosure comprising a fiber cement article 110, a finished layer 120, an optional layer of adhesive 130, and a protective layer 140.

The finished fiber cement article is finished by coating or laminating the top surface of the fiber cement article 110 with a finish 120, which comprises one or more coatings or laminates. The materials used and methods of applying coatings and laminates are all well known in the art, as described above.

Optionally, an adhesive layer 130 is applied to the finish 120 on the fiber cement article 110. In another embodiment, an adhesive layer 130 is optionally applied to one surface of the protective layer 140. In either case, the adhesive layer 130 adhesively secures the protective layer 130 to the finish 120. The adhesive layer 130 can be applied as a full coat or optionally patterned without completely covering either the fiber cement article or protective layer. The adhesive properties of the optional adhesive layer 130 preferably provide a relatively weak bond to the finish 120 so that the polymer film 140 is easily removed without leaving an adhesive residue on the finish 120, and without removing or otherwise damaging the finish 120. Moreover, in one embodiment, the release properties of the adhesive in concert with the tensile strength of the protective layer allow the protective layer to be removed from the protected fiber cement article without tearing or with minimal tearing of the protective layer.

Materials suitable for the protective layer 140 include a polymer film; a paper sheet, optionally coated on at least one face with a polymer film; or a sheet of polymer foam, optionally coated on at least one face with a polymer film. In certain embodiments, the protective layer is a woven or nonwoven polymer fabric. In one embodiment, the thickness of the protective layer is from about 0.0001 inch to about 0.005 inch (about 0.003-0.127 mm). In another embodiment, the thickness of the protective layer is from about 0.001 inch to about 0.003 inch (about 0.025-0.08 mm). The ultimate tensile strength of the protective layer is preferably from about 500 to about 60,000 psi and more preferably from about 1000 to about 5000 psi. As discussed above, in one embodiment, the protective layer resists tearing on removal from the protected prefinished fiber cement article.

In certain embodiments, the protective layer 140 is a monolayer film or a multilayer film. A monolayer film is a protective layer 140 in which a polymer resin is blended with an adhesive. In embodiments using monolayer films, the adhesive layer 130 is integrated into the protective layer 140. Suitable polymer resins from which a polymer film may be manufactured are known in the art, for example, polyethylene, polypropylene, polyvinyl chloride, polyvinylidene chloride, polyester, polyamide, silicone, and blends or copolymers thereof. Polyethylene may be of any suitable type, for example, low density, linear low density, high density, or metallocene. Suitable adhesives include polyacrylate, ethylene-acrylic acid copolymer, ethylene-vinyl acetate copolymer, or mixtures thereof. Methods for blending polymer resins and adhesives are well known in the art using equipment such as high-shear mixers, or single or twin screw extruders. The blended polymer resin and adhesive are then formed into a film by suitable methods, such as, for example, extrusion, blowing, and casting.

A multilayer film is a protective layer 140 formed from more than one layer of similar or dissimilar materials. In one embodiment, an adhesive layer 130 is applied to at least one face. The adhesive may be applied to a polymer film; to a paper sheet, which may optionally comprise a polymer film on the adhesive-coated face; or to a foam sheet, which may optionally comprise a polymer film on the adhesive-coated face. In a preferred embodiment, the protective layer is a polymer film. Any suitable polymer resin known for forming a polymer film may be used for the polymer film, including, for example, polyethylene, polypropylene, polyvinyl chloride, polyvinylidene chloride, polyester, polyamide, silicone or blends or copolymers thereof. Polyethylene may be of any suitable type, for example, low density, linear low density, high density, or metallocene. In one embodiment, the polymer film may be made a blend of two or more polymer resins. In another embodiment, the polymer film comprises layers of polymer resins.

The adhesive layer 130 may be applied to the protective layer 140 using suitable equipment and methods, for example by solvent coating, extrusion, hot-melt coating, calendaring, curtain coating, gravure or pattern coating, spray coating, lamination, pressure-feed die coating, knife coating, roller coating, or by any other suitable technique. The adhesive could be applied to the multilayer films the entire face of the film or in a pattern which could minimize the amount adhesive used and minimize the probability of damage of the finished layer due to excessive adhesion.

Preferred adhesive materials for the adhesive component of monolayer films and multilayer films are pressure-sensitive adhesives and hot-melt adhesives that bond weakly to the finish 120 on the fiber cement article 110. Consequently, the protective layer 140 is easily removed from the finish 120 without leaving any adhesive residue, or otherwise adversely affecting the finish 120, for example, by changing the glossiness (e.g., burnishing spots), changing the color, or removing a portion of the finish 120. Examples of such adhesive materials include compositions based on polyacrylate, polyvinyl ether, polyvinyl acetate, rubber (e.g., natural rubber), polyisoprene, polychloroprene, butyl rubber, neoprene rubber, ethylene propylene diene rubber (EPDM), polyisobutylene, butadiene-acrylonitrile polymer, thermoplastic elastomers, styrene-butadiene rubber, poly-alpha-olefins, amorphous polyolefins, silicones, ethylene-containing copolymers (e.g., ethylene-acrylic acid, ethylene vinyl acetate, ethylene ethyl acrylate, ethylene n-butyl acrylate, and ethylene methyl acrylate), polyurethanes, polyamides, epoxys, polyvinylpyrrolidone and polyvinylpyrrolidone copolymers, polyesters, and mixtures or copolymers thereof. The preferred adhesives are either ethylene acrylic acid copolymer or a mixture of ethyl methylacrylate copolymer and ethylene acrylic acid copolymer in ratios ranging form 6:1-20:1 respectively. The adhesive component may also contain modifiers, for example, tackifiers, plasticizers, fillers, antioxidants, stabilizers, pigments, curatives, crosslinkers, solvents, and the like.

Both monolayer films or multilayer films may be separately manufactured and supplied in a form (e.g., rolls) suitable for continuous application to the finished fiber cement articles using, for example, pressurized rollers or a laminating press. The pressurized rollers may be used either with or without heating. A monolayer polymer film may also be blended and extruded as a thin film, which is immediately applied to a finished fiber cement article. Similarly, a multilayer film may be simultaneously co-extruded and applied to a finished fiber cement article.

Both monolayer films or multilayer films with or without adhesives may be treated with Corona or other surface treatment technologies to get desired adhesion known to one of ordinary skill in the art. The preferred surface tension on the surface of protective layer to finished layer is 32 to 65 dynes. The more preferred surface tension on the same surface is 34 to 48 dynes. The treatment may be included in protective layer manufacture, or before laminating the protective layer on finished layer.

In another embodiment, an adhesive layer 130 is applied to the finish 120 of a fiber cement article 110, and the protective layer is applied to the adhesive layer 130. Suitable adhesives for the adhesive layer 130 and suitable protective layers 140 are similar to those described above for a multilayer film. The adhesive layer is applied to the fiber cement article by means described above.

The protective layer 140 preferably resists abrasion from adjacent objects, for example, fiber cement articles, pallets, and metal or plastic bands, when the fiber cement articles are stacked one atop the other on a shipping pallet, and on handling. Consequently, in one embodiment of the disclosed packaging system, the fiber cement articles are stacked front-to-back, obviating the need to flip alternate articles when stacking. In other embodiments, the fiber cement articles are stack front-to-front and back-to-back. Thus a protective layer of predetermined thickness, tensile strength, and impact strength is selected to provide the desired level of durability. The protective layer 140 and adhesive are selected so to not adversely affect the finish 120, for example by changing the glossiness (e.g., burnishing or polishing a matte finish), changing the color of the finish, or removing a portion of the finish.

Figure 1B:
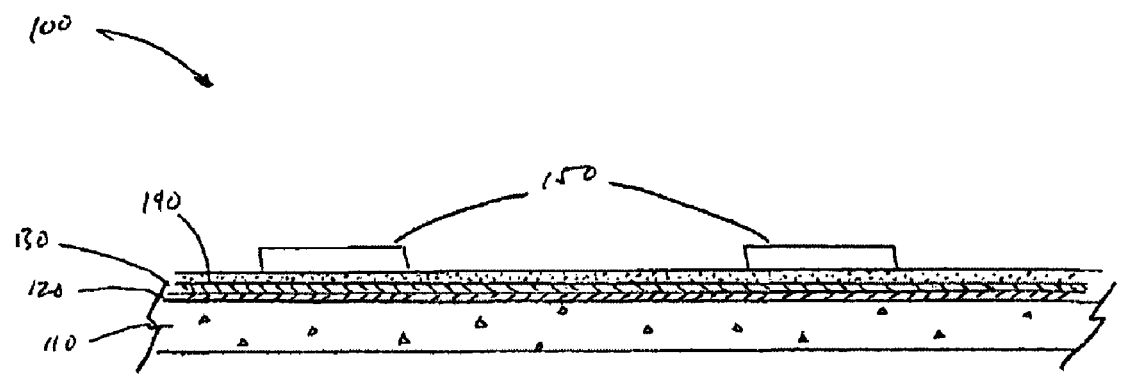

An alternative embodiment illustrated in FIG. 1B is similar to the embodiment illustrated in FIG. 1A, further comprising one or more optional spacers 150. Optionally, one or more spacers 150 are applied to provide additional shock absorption between fiber cement articles. The spacer 150 preferably absorbs shock and does not concentrate forces to the extent that those forces damage the fiber cement article 110 or the finished surface 120.

Spacers 150 are preferably made from a material that does not damage or mar the surface of the finish 120. The thickness, size, and shape of the spacers 150 will depend on the factors including the compressibility and resilience of the spacer material, as well as the size, shape, and weight of the fiber cement article 110; the characteristics of the finish 120; the characteristics of the protective layer 140; and the anticipated storage, shipping, and handling conditions of the protected fiber cement article. Suitable spacer materials include solid polymeric materials, such as elastomers, rubber, or solid plastics; polymeric foams, such as polyethylene, polystyrene, or polyurethane foam; fabric-based materials, such as felt or fabric meshes; or any other relatively soft material, such as paper or wood-fiber mat.

The thickness of a spacer 150 is preferably from about 0.005 to about 1.0 inch, more preferably from about 0.01 to about 0.05 inch. The width of a spacer 150 is preferably from about 0.1 to about 2 inch, more preferably from about 0.3 to about 0.7 inch. The spacer 150 may be continuous strip, a discontinuous strip, or a series of predetermined shapes extending in a predetermined pattern over the surface of the protective layer. For example, as the article is run through a machine that applies spacers, the spacers may be applied in a pattern parallel to the feed direction. In another embodiment, the spacers are applied in a pattern perpendicular to the feed direction. In still another embodiment, the spacers are applied in a pattern at an angle to the feed direction. In still another embodiment, the spacers are applied in a different pattern. The preferred number of spacers 150 for each fiber cement article will depend on the properties of the spacers 150, as well as the size, shape, and weight of the fiber cement article. In one embodiment, at least 2 spacers 150 are used for each fiber cement article. In other embodiments, up to about 10, about 20, about 30, about 40, about 50, or more spacers 150 are used for each fiber cement article. The spacers may be pre-manufactured or manufactured during the packaging process, for example using a plastic extruder.

Spacers 150 may be manually or mechanically placed on top of protective layer 140 during the course of stacking a series of fiber cement articles. Spacers 150 may also be pre-adhered to the protective layer 140, or to the backside of a fiber cement article 110. Spacers 150 may also be coextruded with the protective layer 140.

A second embodiment of a protected fiber cement article 200 according to the present disclosure is illustrated in cross section in FIG. 2. A finished fiber cement article is prepared by applying to a fiber cement article 110, a finish 120, as described above. A protective layer 140 and an optional adhesive layer 130 are also similar to those described above.

In the embodiment illustrated in FIG. 2, the protective layer 140 is applied to the finish 120 on the fiber cement article 110 such that a portion of the protective layer 140 is folded back upon itself, creating a folded spacer 150' that provides additional shock absorption. Detail A in FIG. 2 illustrates the flattened state of the spacer 150' in use. The spacer 150' reduces wear on the protective layer 140. The folded spacers 150' are formed when applying protective layer 140 to the surface of fiber cement article 110. In another embodiment, the folded spacers 150' are formed before applying the protective layer to the finish 120.

The protective layer 140 and an optional adhesive layer 130 are similar to those described above. The properties of the protective layer 140 will depend on the particular material from which the protective layer is made. The thickness, resilience, and compressibility of the protective layer 140 is predetermined to form a folded spacer 150' with the desired properties.

The spacers 150' may be formed parallel to the axis on which the fiber cement article is run through the packaging machine. In another embodiment, spacers 150' are formed perpendicular to the feed direction. In yet another embodiment, spacers 150' are formed at an angle to the feed direction. In still another embodiment, spacers 150' are formed at a plurality of angles to the feed direction.

The preferred number of spacers 150' for each fiber cement article will depend on the properties of the spacers 150', as well as the size, shape, and weight of the fiber cement article. In one embodiment, at least 2 spacers 150' are used for each fiber cement article. In other embodiments, up to about 10, about 20, about 30, about 40, about 50, or more spacers 150' are used for each fiber cement article.

A third embodiment of a protected fiber cement article 300 according to the present disclosure is illustrated in FIG. 3. A protective layer 140 is applied to the finish 120 on a fiber cement article 110 by imparting an electrostatic charge to the protective layer 140. The electrostatic charge applied to the protective layer 140 can be up to 50 KV, preferably at 20-40 KV, more preferable around 30 KV. The electrostatic charge can be applied to the protective layer just prior to adhering it to the finished fiber cement or it can be applied the protective layer after it has been adhered to the finished fiber cement. The illustrated embodiment includes optional folded spacers 150' integrally formed by folding the protective layer 150' as described above. Detail A in FIG. 3 illustrates the flattened state of the spacer 150' in use. The folded spacers 150' are formed when applying protective layer 140 to the surface of fiber cement article 110. In another embodiment, the folded spacers 150' are formed before applying the protective layer to the finish 120. In certain embodiments, the electrostatic charge is applied to the protective layer 140 after it is placed on the finish 120.

The electrostatic charge requires less initial 180 degree peel strength (g/in) to achieve the same results as an adhesive layer 130 in FIG. 1 for the initial stacking of the pre-finished fiber cement article. This reduces the possibility of damage to the prefinished fiber cement article. The electrostatic charge also leads to protection of the finished edges of the fiber cement article due to electrostatic forces. The prefinished fiber cement article is better protected from damage.

The protective layer 140 is similar to the protective layer described above. The properties of a protective layer 140 will depend on the particular material from which the protective layer is made. With electrostatic charge, the selection of materials for the protective layer 140 is less strict, with more films being suitable for the protective layer. The thickness, resilience, and compressibility of the protective layer 140 can be predetermined to form a folded spacer 150' with the desired properties.

The spacers 150' may be formed parallel to the axis on which the fiber cement article is run through the packaging machine. In another embodiment, spacers 150' are formed perpendicular to the feed direction. In yet another embodiment, spacers 150' are formed at an angle to the feed direction. In still another embodiment, spacers 150' are formed at a plurality of angles to the feed direction.

The preferred number of spacers 150' for each fiber cement article will depend on the properties of the spacers 150', as well as the size, shape, and weight of the fiber cement article. In one embodiment, at least 2 spacers 150' are used for each fiber cement article. In other embodiments, up to about 10, about 20, about 30, about 40, about 50, or more spacers 150' are used for each fiber cement article.

Another embodiment (not illustrated) comprises spacers 150 similar to those described above in the embodiment illustrated in FIG. 1, either with or without folded spacers.

Figure 4:
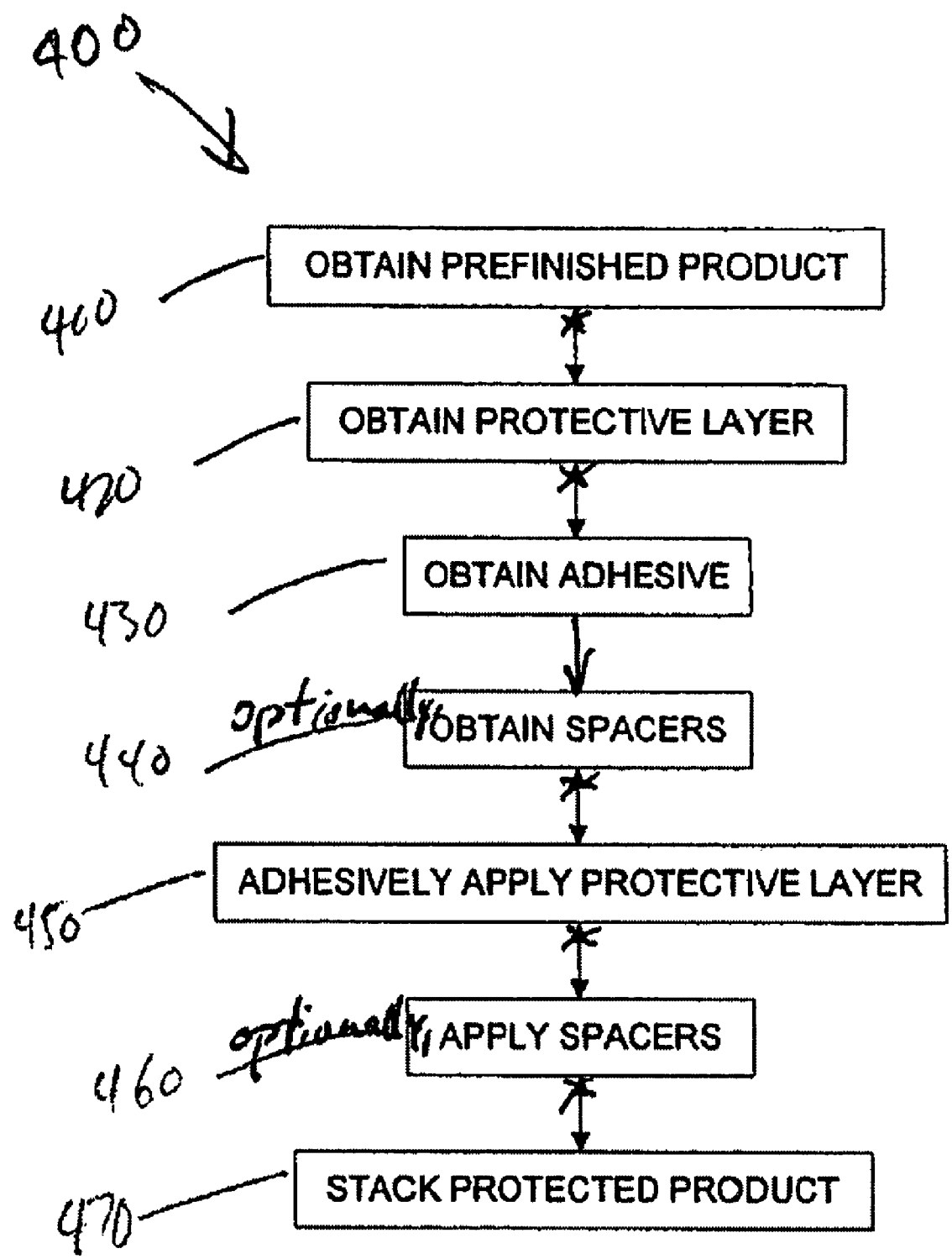
FIG. 4 illustrates an embodiment of the disclosed method for manufacturing a protected prefinished fiber cement article where the protective layer is adhere to the finished fiber cement article with an adhesive.

FIG. 4 illustrates an embodiment 400 of the disclosed method for packaging prefinished fiber cement articles. In step 410, the user obtains a prefinished fiber cement article. In step 420, the user obtains a protective layer with a predetermined thickness, tensile strength, and impact strength. In step 430, the user obtains an adhesive with predetermined adhesive properties. As described above, the adhesive may be integrated into the protective layer in a monolayer film, may be preapplied to the protective layer in a multilayer film, or may be separate from the protective layer. In optional step 440, the user obtains spacers of predetermined thickness, compressibility, and resilience. In step 450, the protective layer is adhesively applied to a finished surface of the fiber cement article, forming a protected fiber cement article. In one embodiment, the protective layer is applied after the finish (e.g., paint) is fully cured. In another embodiment, the protective layer is applied while the finish is partially cured, but tack-free. Folded spacers are optionally formed as the protective layer is applied to the fiber cement article. In optional step 460, spacers are applied to the protected fiber cement article. In step 470, a plurality of protected fiber cement articles are arranged in a stack. Preferably, the stack comprises a predetermined number of protected fiber cement articles.

Figure 5:
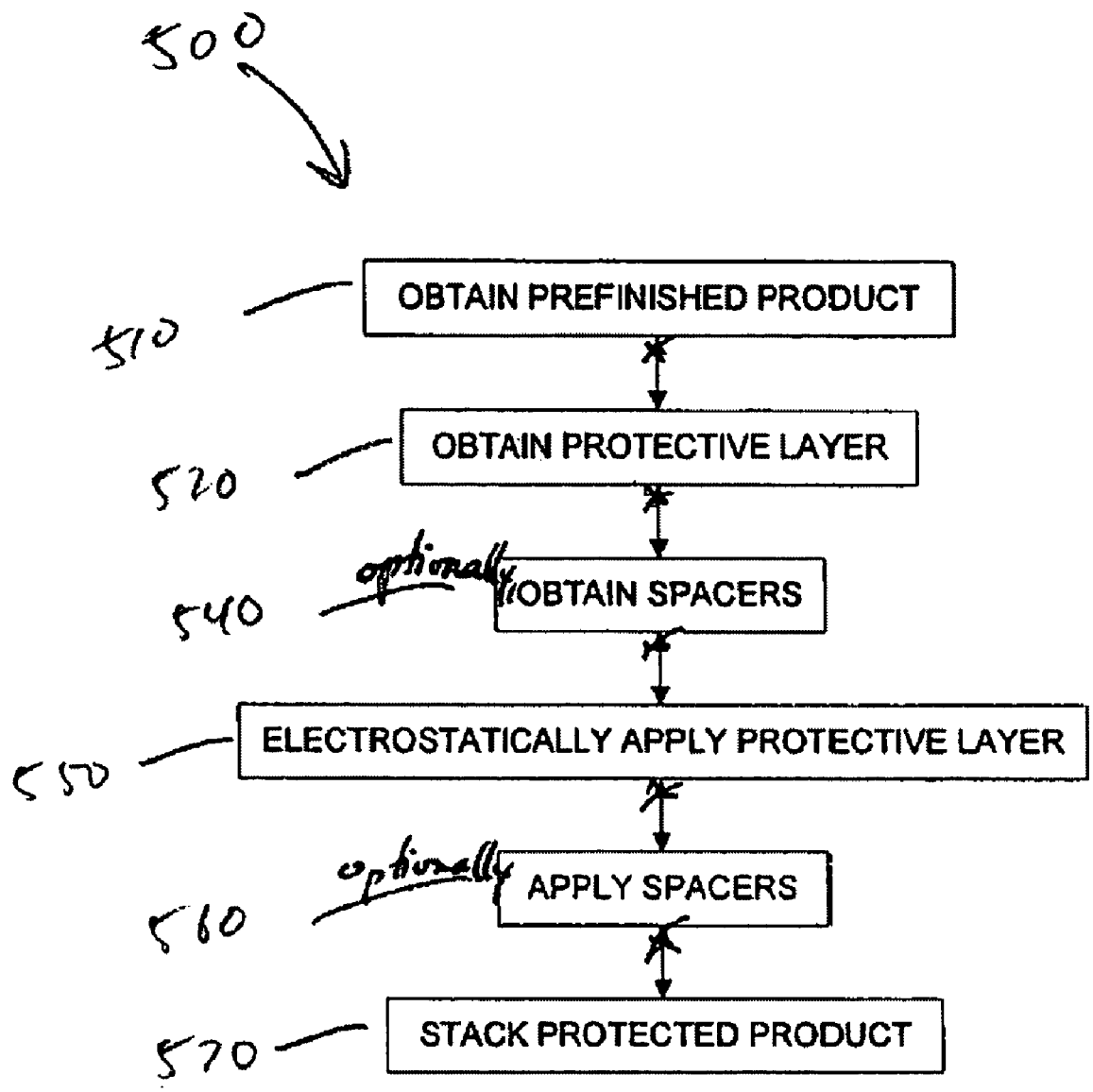
FIG. 5 illustrates an embodiment of the disclosed method for manufacturing a protected prefinished fiber cement article protective layer is adhere to the finished fiber cement article electrostatically with no adhesive.

FIG. 5 illustrates yet another embodiment 500 of the disclosed method for packaging prefinished fiber cement articles. In step 510, the user obtains a prefinished fiber cement article. In step 520, the user obtains a protective layer with a predetermined thickness, tensile strength, and impact strength. In this embodiment, the no adhesive is used. In optional step 540, the user obtains spacers of predetermined thickness, compressibility, and resilience. In step 550, the protective layer is electrostatically applied to a finished surface of the fiber cement article, forming a protected fiber cement article. Folded spacers are optionally formed as the protective layer is applied to the fiber cement article. In optional step 560, spacers are applied to the protected fiber cement article. In step 570, a plurality of protected fiber cement articles are arranged in a stack. Preferably, the stack comprises a predetermined number of protected fiber cement articles.

Figure 6:
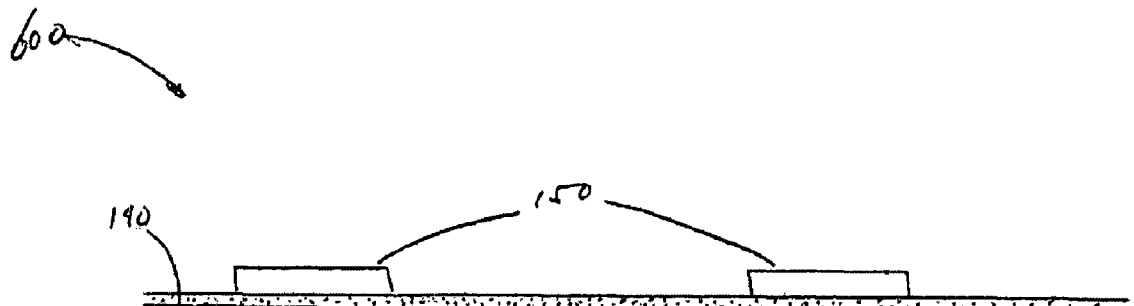
FIG. 6 illustrates in cross-section an embodiment of the disclosed protective layer with spacers bonded thereto.

FIG. 6 illustrates an embodiment 600 of the disclosed protective layer with spacers bonded thereto comprising a protective layer 640 and one or more spacers 150. The spacers are bonded to the protective layer by any means known in the art. In one embodiment, the spacers are bonded to the protective layer using an adhesive with predetermined adhesive properties. In another embodiment, the spacers are bonded to the protective layer thermally. Optionally, the finished protective layer is packaged in a form suitable for application to prefinished fiber cement articles, for example, in a roll.

Figure 7:
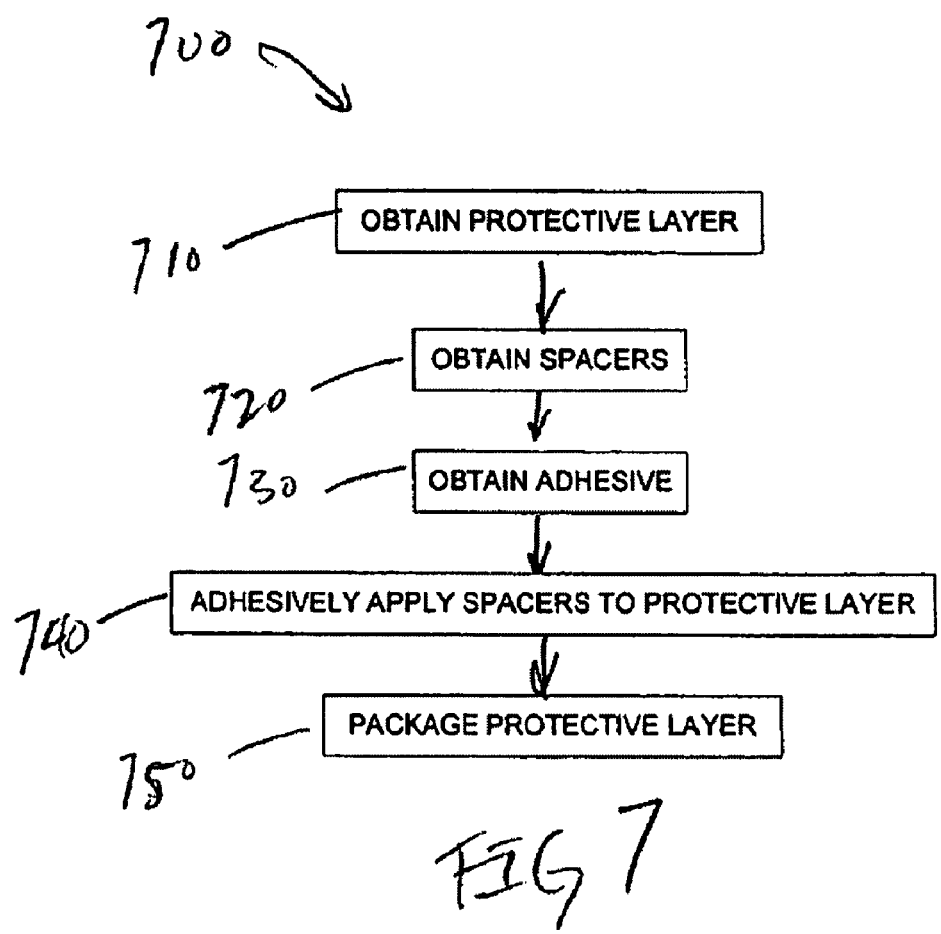
FIG. 7 illustrates an embodiment of the disclosed method for manufacturing a protective layer with spacers bonded thereto.

FIG. 7 illustrates an embodiment 700 of the disclosed method for manufacturing a protective layer with spacers 150 bonded thereto. In step 710, a protective layer with predetermined thickness, tensile strength, and impact strength is obtained. In step 720, spacers of predetermined shape, thickness, compressibility, and resilience are obtained. In optional step 730, an adhesive of predetermined bonding strength is obtained. In step 740, the spacers are bonded to a face of the protective layer. In embodiments using an adhesive, the spacers are bonded to the protective layer with the adhesive. In other embodiments, the spacers are bonded to the protective layer by other means, for example, thermally. In optional step 750, the finished protective layer is packaged in a form suitable for application to prefinished fiber cement articles, for example, in a roll.

Example 1

Plastic "Slip Sheet"

One face of a 5/16"×4"×6" fiber cement plank (Selected Cedarmill texture, James Hardie Building Products, Fontana, Calif.) was finished with two coats of paint (khaki brown, 15 gloss units, James Hardie Building Products, Fontana, Calif.). The first coat of paint was dried in a 60° C. oven for 4 min. The dry thickness was 0.002 to 0.004 inch. The second coat was dried in a 105° C. oven for 2 min. The dry thickness was 0.001 to 0.003 inch. A 0.0025" thick, clear polyethylene film (LDF 318, Dow Chemical) was tested as a slip sheet to protect the painted surface. The polyethylene film was applied to the painted surface of fiber cement after the fiber cement plank was removed from the paint-drying oven while the surface of the plank was about 90-140° F. A 1/16"-thick sheet of silicone rubber sheet (30 durometer, Shore A) was placed on top of the polyethylene film to accommodate the textured surface of the fiber cement plank. This assembly was pressed at 25 PSI in a platen press, and the pressure released immediately. The polyethylene film did not acceptably adhere to the painted surface, delaminating with shaking or inversion. The film was removed immediately after adhering it the plank and the initial 180 degree peel strength was 0.5-3 g/in. The film did not tear when removed. After removing the film, the finished surface of the plank had an uneven gloss and burnishing marks.

Example 2

Blended Monolayer Film

A fiber cement plank was painted as described in EXAMPLE 1. A 0.002" thick monolayer film of blended polyethylene and ethylene acrylic acid (Integral 709 film, Dow Chemical) was laminated to the finished surface of the fiber cement plank as described in EXAMPLE 1. The film adhered to the finished surface, and did not delaminate with shaking or inversion, yet peeled-off easily. The initial 180 degree peel strength was 2-15 g/in. After removing the film, the finished surface of the plank had a uniform appearance with no burnishing, change in glossiness, or change in color. The film did not tear when removed. No adhesive residue was left on the finished surface and none of the finish was removed.

Example 3

Storage Test of a Multilayer-Film Protected Plank

Fiber cement planks, 5/16"×8.25"×3' (Selected Cedarmill texture, James Hardie Building Products, Fontana, Calif.), were painted as described in EXAMPLE 1. A clear multilayer film of polyethylene coated with ethylene acrylic acid adhesive (DAF 708, 0.0009" thick, Dow Chemical) was applied to the finished surface of each plank just after emerging from the paint drying while the surface of the plank was about 90-140° F. On top of the film was placed a 1/8"-thick silicone rubber sheet (30 durometer, Shore A). This assembly was placed in a roller press moving at 50 ft/min at a pressure of 180 lb/linear inch (PLI). The film adhered to the finished surface and did not delaminate with shaking or inversion, yet peeled-off easily. The initial 180 degree peel strength was 2-15 g/in. After removing the film, the finished surface of the plank had a uniform appearance with no burnishing, change in glossiness, or change in color. The film did not tear when removed. No adhesive residue was left on the finished surface and none of the finish was removed.

Protected fiber cement planks were stacked on a 42"×13"12' pallet. The pallet was completed with unprotected planks (840 total planks, 4 long by 5 across by 42 high). Some of the planks were stacked face-to-face and back-to-back, while others were stacked face-to-back. The pallet weighed about 2000 lb. A test assembly was constructed by stacking a dummy pallet weighing about 2000 lb on top of the test pallet. The test assembly was stored for 3 days. When disassembled, the film was torn and damaged. After removing the film, the finished surfaces of the planks showed serious wear including damage and scratches.

Example 4

Storage and Transport of Film and Spacer Protected Planks

Fiber cement planks were painted and a multilayer film laminated to the finished surface of each plank as described in EXAMPLE 3. Two 0.08"×0.5" rubber strips were placed lengthwise on top of the film, approximately 1 inch away from each long edge of each plank. A test pallet of stacked planks was assembled as described in EXAMPLE 3. A test assembly of the test pallet and a dummy pallet was constructed as described in EXAMPLE 3. The test assembly was stored for 3 days. The test assembly was then placed on the forward end of the bed of a truck (test pallet on the bottom). A stack of two dummy pallets was placed behind and against the test assembly, and a single dummy pallet placed behind and against the stack of dummy pallets. The truck was driven 3000 miles. The planks were inspected upon return showing no damage. The plastic film was easily removed. The 180 degree peel strength was 2-15 g/in. After removing the film, the finished surface of the plank had a uniform appearance with no burnishing, change in glossiness, or change in color. The film did not tear when removed. No adhesive residue was left on the finished surface and none of the finish was removed.

Test results from EXAMPLE 1-EXAMPLE 4 are summarized in TABLE 1. The "Peel-off Appearance" results were determined immediately after laminating the protective layer to the finished plank. In no case did the protective layer leave an adhesive residue on the finish or remove any part of the finish. The "Storage and Transport" results were after 3-days storage in EXAMPLE 3, and 3-days storage and 3000-miles transport in EXAMPLE 4.

TABLE I

| Example | Protective layer | Spacer | Peel-Off Appearance | Storage & Transport |
|---|---|---|---|---|
| 1 | 2.5 mil polyethylene | None | Uneven gloss, burnishing | N/A |
| 2 | 2.0 mil monolayer, blended polyethylene & ethylene acrylic acid | None | Uniform gloss, no burnishing | N/A |
| 3 | 0.9 mil multilayer, polyethylene coated with ethylene acrylic acid | None | Uniform gloss, no burnishing | Multilayer film damaged, finished surface scratched & damaged |
| 4 | 0.9 mil multilayer, polyethylene coated with ethylene acrylic acid | Two 80 mil × ½" rubber strips | Uniform gloss, no burnishing | Multilayer film intact, finished surface intact |

Example 5

Modified Adhesive Multilayer-Film Protected Plank

One face of a 5/16"×4"×6" fiber cement plank (Selected Cedarmill texture, James Hardie Building Products, Fontana, Calif.) was finished as described in EXAMPLE 1. A 0.002" thick, clear polyethylene film coated with a 12:1 ethyl methacrylate copolymer:ethylene acrylic acid copolymer mixture as the adhesive (XUR 24, Dow Chemical) was tested as a slip sheet to protect the painted surface. The polyethylene film was applied to the painted surface of fiber cement after the fiber cement plank was removed from the paint-drying oven while the surface of the plank was about 140-200° F. The film was pressed at 189 PLI with a ¼-½" thick, hot roll of silicone rubber (50-60 durometer, Shore A, 220-230° F.) at a speed of 80 ft/min. The film adhered to the finished surface and did not delaminate with shaking or inversion, yet peeled-off easily. The initial 180 degree peel strength was around 2-24 g/inch. After removing the film, the finished surface of the plank had a uniform appearance with no burnishing, change in glossiness, or change in color. The film did not tear when removed. No adhesive residue was left on the finished surface and none of the finish was removed.

Example 6

Slip Sheet without Adhesive Under Electrostatic Charger

One face of a 5/16"×8.25"×12" fiber cement plank with primer (Selected Cedarmill texture, James Hardie Building Products, Fontana, Calif.) was finished as described in EXAMPLE 1. A 0.002" thick clear polyethylene film (XP 6518G, Pliant Corp) was treated with electrostatic charge (Simco CH50 Electrostatic charge unit) at a voltage of 30 KV. The charged film was then applied to the painted surface of fiber cement after the fiber cement plank was removed from the paint-drying oven while the surface of the plank was about 140-200° F. The film was pressed at 189 PLI with a ¼-½" thick, hot roll of silicone rubber (50-60 durometer, Shore A, 220-230° F.) at a speed of 80 ft/min. The film adhered to the finished surface and did not delaminate with shaking or inversion, yet peeled-off easily. The initial 180 degree peel strength was around 2-3 g/inch. After removing the film, the finished surface of the plank had a uniform appearance with no burnishing, change in glossiness, or change in color. The film did not tear when removed. Similar adhesion and other performances were obtained when electrostatic charge was set after lamination.

Example 7

Slip Sheet with Adhesive Under Electrostatic Charger

One face of a 5/16"×8.25"×12" fiber cement plank with primer (Seclected Cedarmill texture, James Hardie Building Products, Fontana, Calif.) was finished as described in EXAMPLE 1. A 0.002" thick, clear polyethylene film coated with a 20:1 ethyl methacrylate copolymer:ethylene acrylic acid copolymer mixture as the adhesive (XUR 22, Dow Chemical) was tested as a slip sheet to protect the painted surface. The film was further treated with electrostatic charge (Simco CH50 Electrostatic charge unit) at a voltage of 30 KV. The charged film was then applied to the painted surface of fiber cement after the fiber cement plank was removed from the paint-drying oven while the surface of the plank was about 140-200° F. The film was pressed at 189 PLI with a ¼-½" thick, hot roll of silicone rubber (50-60 durometer, Shore A, 220-230° F.) at a speed of 80 ft/min. The film adhered to the finished surface and did not delaminate with shaking or inversion, yet peeled-off easily. The initial 180 degree peel strength was around 2-10 g/inch. After removing the film, the finished surface of the plank had a uniform appearance with no burnishing, change in glossiness, or change in color. The film did not tear when removed. Similar adhesion and other performances were obtained when electrostatic charge was set after lamination.

Example 8

Slip Sheet without Adhesive Under Corona Treatment

One face of a ⁵⁄₁₆"×8.25"×12" fiber cement plank with primer (Selected Cedarmill texture, James Hardie Building Products, Fontana, Calif.) was finished as described in EXAMPLE 1. A 0.002" thick clear polyethylene film (XP 6518G, Pliant Corp) was treated with Corona to get surface tension as 38 dynes. The treated film was then applied to the painted surface of fiber cement after the fiber cement plank was removed from the paint-drying oven while the surface of the plank was about 140-200° F. The film was pressed at 189 PLI with a ¼-½" thick, hot roll of silicone rubber (50-60 durometer, Shore A, 220-230° F.) at a speed of 200 ft/min. The film adhered to the finished surface and did not delaminate with shaking or inversion, yet peeled-off easily. The initial 180 degree peel strength was around 2-20 g/inch. After removing the film, the finished surface of the plank had a uniform appearance with no burnishing, change in glossiness, or change in color. The film did not tear when removed.

Comprehensive peel strength results from EXAMPLE 1-EXAMPLE 3 and EXAMPLE 5-EXAMPLE 8 are summarized in TABLE II. The "Peel-off Appearance" and initial peel strength results were determined immediately after laminating the protective layer to the finished plank. The aged peel strength results are after the protected finished fiber cement article under went accelerated aging. To diminish or minimize the amount of damage to the prefinished fiber cement article, the ideal peel strengths should be between 2-200 g/in.

TABLE II

| Example | Protective Layer | Adhesion Type | Peel-Off Appearance | Initial Peel Strength, g/in | Aged Peel Strength, g/in |
|---|---|---|---|---|---|
| 1 | 2.5 mil polyethylene | None | Uneven gloss, burnishing | 0.5-3 | 0 |
| 2 | 2.0 mil monolayer, blended polyethylene & ethylene acrylic acid copolymer | Adhesive only | Uniform gloss, no burnishing | 2-30 | 2-300 |
| 3 | 0.9 mil multilayer, polyethylene coated with ethylene acrylic acid copolymer | Adhesive only | Uniform gloss, no burnishing | 2-30 | 2-300 |
| 5 | 0.5 mil multilayer polyethylene coated with ethyl methacrylate copolymer/ethylene acrylic acid copolymer | Adhesive only | Uniform gloss, no burnishing | 2-24 | 2-200 |
| 6 | 0.5 mil monolayer, polyethylene & electrostatic charge | Electrostatic only | Uniform gloss, no burnishing | 2-3 | 0 |
| 7 | 0.5 mil multilayer polyethylene coated with ethyl methacrylate copolymer/ethylene acrylic acid copolymer and electrostatic charge | Electrostatic and Adhesive | Uniform gloss, no burnishing | 2-26 | 2-200 |
| 8 | 0.5 mil multilayer, Corona treated | None | Uniform gloss, no burnishing | 2-20 | 2-100 |

Example 9

Slip Sheet with Adhesive-Aging and Pressure Tests

One face of a ⁵⁄₁₆"×8.25"×12" fiber cement plank with primer (Smooth, James Hardie Building Products, Fontana, Calif.) was finished as described in EXAMPLE 1. A 0.002" thick, clear polyethylene film coated with an ethyl methacrylate copolymer:ethylene acrylic acid copolymer mixture as the adhesive (XUS66197.00, Dow Chemical) and a 0.002" thick, clear polyethylene film (Integral 816, Dow Chemical) was tested as a slip sheet to protect the painted surface. The polyethylene film was applied to the painted surface of fiber cement after the fiber cement plank was removed from the paint-drying oven while the surface of the plank was about 140-200° F. The film was pressed at 189 PLI with a ¼-½" thick, hot roll of silicone rubber (50-60 durometer, Shore A, 220-230° F.) at a speed of 80 ft/min. The film adhered to the finished surface and did not delaminate with shaking or inversion, yet peeled-off easily. The initial 180 degree peel strength was around 20-35 g/inch and 30-40, respectively.

Protected prefinished fiber cement boards could be stored for up to years before installation onto a wall. The peel adhesion strength of the protective layer could increase with storage time due to temperature, pressure, moisture change, and others. This could cause damage to the prefinished fiber cement article. To determine the effects of pressure and aging, samples were stacked outside with natural season changes in Southern California. Table III showed that, overall, all laminates had peel adhesion increased after 212 days imitated stacking at the job site. To imitate the actual job site stacking, lab aging tests were carried out at the different temperature with appropriate stacking pressure as shown in Table III.

TABLE III

| Exposure Time | XUS66193 | | Integral 816 | |
|---|---|---|---|---|
| | 72° F. | 0° F. | 72° F. | 0° F. |
| Peel Strength after Stacked at 50 psi in Nature | | | | |
| 0 day | 10 | 4 | 2 | 6 |
| 51 days | 12 | 5 | 18 | 10 |
| 85 days | 10 | 7 | 23 | 13 |
| 212 days | 10 | 8 | 22 | 28 |
| Peel Strength after Lab Weathering and Pressure Tests (g/in) | | | | |
| 140° F. @ 7 d | 13 | 5 | 11 | 5 |
| 140° F. @ 13 d | 10 | 10 | 10 | 11 |
| 160° F. @ 50 psi @ 4 d | 9 | 9 | 14 | 7 |
| 150° F. @ 50 psi @ 7 d | 18 | 19 | 24 | 11 |

Example 10

Slip Sheets without Adhesive Under Corona Treatment Aging Tests

One face of a 5/16"×8.25"×12" fiber cement plank with primer (Smooth texture, James Hardie Building Products, Fontana, Calif.) was finished as described in EXAMPLE 1. A 0.002" thick clear polyethylene film (Dow Chemical) and a 0.002" thick clear polypropylene film (Dow Chemical) were treated with Corona. Samples were prepared with treated films having a surface energy of 46 and 60 dyn/cm. The treated film was then applied to the painted surface of fiber cement after the fiber cement plank was removed from the paint-drying oven while the surface of the plank was about 140-200° F. The film was pressed at 232 PLI with a ¼-½" thick, hot roll of silicone rubber (85 durometer, Shore A, 220-230° F.) at a speed of 200 ft/min. The initial 180 degree peel strength was measured. The samples under went accelerated aging tests. Table IV has the details of the peel strength tests at the various temperatures.

TABLE IV

| Films | 180 Degree Peel Adhesion, g/inch | | | | |
|---|---|---|---|---|---|
| Treated | Initial | 72° F. | 150° F. @ 7 d | 72° F. | 32° F. |
| PP with 60 dyn/cm | 17 | 12 | 43 | 70 | 193 |
| PP with 46 dyn/cm | 12 | 13 | 20 | 33 | 123 |
| PE with 60 dyn/cm | 14 | 22 | 70 | 58 | 185 |
| PE with 46 dyn/cm | 14 | 15 | 55 | 45 | 57 |

Example 11

The Plastic Slip Sheet with UV Resistance

One face of a ¼"×25"96" fiber cement soffit (James Hardie Building Products, Fontana, Calif.) was finished with two coats of James Hardie water based paint with white color. The first coat of paint was dried in an oven to a board surface temperature of 100 to 160° F. The dry film thickness of coating was 0.0005 to 0.002 inch. The second coat was dried in an oven to a board surface temperature of 140 to 200° F. The dry film thickness of coating was 0.0005 to 0.002 inch. A 0.002" thick, clear polyethylene film (XP 6297, Pliant Corp) with an adhesive was applied to the painted surface of fiber cement after the fiber cement plank was cooled 100 to 120° F. This assembly was pressed at 100 PLI with a ¼-½" thick, hot roll of silicone rubber (50-60 durometer, Shore A, 220-230° F.) at a speed of 25 ft/min and a surface temperature of 180 to 230° F. The initial 180 degree peel strength was around 50 g/inch. The protected prefinished fiber cement was subjected to accelerated weathering tests (QUV) in which samples are exposed to the damaging effects of long term outdoor exposure to ultraviolet radiation, heat, and moisture. A QUV chamber was used with UVA lamps and cyclically ran 4 hrs with UV, then 4 hrs with condensation at 120 to 140° F. After 5 days in the QUV chamber, the peel strength of the clear protective layer increased to 1100 g/inch and removal of the protective layer caused damage to the surface of the finished fiber cement article by removing a portion of the finished layer. Samples were also prepared using with a 0.002" thick, white pigmented polyethylene film (X3-995-1369.2, Pliant Corp.) and a 0.002" thick, black pigmented polyethylene film (XP 6191F, Pliant Corp.) using the procedure described above. The white pigment was titanium oxide and the black pigment was carbon black. The pigments were added into the back side of protective layer. No pigment was added into the adhesive side. The initial adhesion of the laminate was similar for the protective layer with and without pigments. The QUV testing was repeated with these samples. The films with the white & black pigmentation in protective layer quite significantly retard the peel strength development from the initial 50 g/in to between 137-150 g/in within a 21 day period. The protective layer can still be easily removed by hand. Table V lists the effects of UV exposure on the peel strengths of the protective layer.

TABLE V

| | QUV Exposure time (days) | | | |
|---|---|---|---|---|
| | 0 | 5 | 14 | 21 |
| | 180 degree peel strength at ambient temperature, g/inch | | | |
| Protective layer without pigment | 50 | 1100 | 1437 | N/A |
| Protective layer with white pigment | 50 | 90 | 125 | 137 |
| Protective layer with black pigment | 50 | 105 | 140 | 150 |

Example 12

Slip Sheet with UV Resistance

One face of a 5/16"×8.25"×12" fiber cement smooth plank (James Hardie Building Products) was finished with two coats of James Hardie water based paint (khaki brown, 15 gloss units, James Hardie Building Products, Fontana, Calif.). The first coat of paint was dried in an oven to a board surface temperature of 100 to 160° F. The dry film thickness of coating was 0.0005 to 0.002 inch. The second coat was dried in an oven to a board surface temperature of 140 to 200° F. The dry film thickness of coating was 0.0005 to 0.002 inch. A 0.002" thick, clear polyethylene film (XP 6297, Pliant Corp) with an adhesive was applied to the painted surface of fiber cement after the fiber cement plank was cooled 100 to 120° F. This assembly was pressed at 125 PLI with a ¼-½" thick, hot roll of silicone rubber (85 durometer, Shore A, 220-230° F.) at a speed of 25 ft/min and a surface temperature of 180 to 230° F. The initial 180 degree peel strength was around 50 g/inch. Samples were also prepared using with a 0.002" thick, white pigmented polyethylene film in which the white pigment was titanium oxide (Dow Chemical) and a 0.002" thick, clear film with an UV absorber and a heat stabilizer (Dow Chemical). The initial 180 degree peel strength were about 5 g/inch. The prefinished fiber cement samples were subjected to accelerated weather tests (QUV) and actual outdoor sun light exposure. For QUV, the prefinished fiber cement samples were placed in the QUV cabinet set up with UVB 313 bulbs. The cabinet temperature was set at 60° C. The prefinished fiber cement samples were pulled from the cabinet at specific time intervals and tested for slip sheet peel strength at 0° F. The corresponding UV index was from 2.5 to 7.5. Every few weeks, the samples were taken back for peel strength test at 0° F. Table VI lists the detailed results of the effects of UV exposure from sunlight and QUV on the peel strengths of the protective layer.

TABLE VI

180 Degree Peel Strength at 0° F., g/inch

| | Sunlight Exposure, days | | | | | |
|---|---|---|---|---|---|---|
| | 0 | 5 | 11 | 28 | 56 | 116 |
| Protective layer without Pigment | 6 | 20 | 20 | 110 | 380 | 500 |
| Protective layer with UV absorber | 5 | 30 | 20 | 150 | 270 | 445 |
| Protective layer with White Pigment | 4 | 2 | 12 | 12 | 20 | 270 |

| | QUV Exposure, hrs | | | | |
|---|---|---|---|---|---|
| | 0 | 5 | 30 | 45 | 56 |
| Protective layer without Pigment | 6 | 85 | 160 | 400 | 350 |
| Protective layer with UV absorber | 5 | 40 | 280 | 290 | 300 |
| Protective layer with White Pigment | 4 | 34 | 140 | 220 | 290 |

The foregoing examples serve to illustrate the preferred embodiments and are not intended as limitations. Modifications and variations of the preferred embodiments will be apparent to those skilled in the art without departing from spirit of the invention, the scope of which is limited only by the appended claims.

What is claimed is:

1. A prefinished fiber cement article comprising: a fiber cement siding article, having a top and sides where the top has a tack-free, partially cured finish layer and a removable polymer film protective layer, wherein the protective layer is adhered to the finish layer by an adhesive, wherein the adhesive is formulated to adhere the polymer film to the finish layer and maintain a sufficiently weak bond to the finish layer, said bond having a peel strength of 15 to 190 g/inch so that the protective layer can be manually removed without leaving an adhesive residue on the finish.

2. The prefinished fiber cement article of claim 1, wherein the polymer film is polyethylene.

3. The prefinished fiber cement article of claim 1, wherein the polymer film is from 0.0001 inch to 0.005 inch thick.

4. The prefinished fiber cement article of claim 3, wherein the protective layer is from about 0.001 inch to about 0.003 inch thick.

5. The prefinished fiber cement article of claim 1, wherein the adhesive is selected form the group consisting of polyacrylate, ethylene acrylic acid copolymer, polyvinyl ether, polyvinyl acetate rubber, polyisoprene, polychloroprene, butyl rubber, neoprene rubber, ethylene propylene diene rubber, polyisobutylene, butadiene-acrylonitrile polymer, thermoplastic elastomers, styrene-butadiene rubber, poly-alpha-olefins, amorphous polyolefins, silicones, ethylene-containing copolymers, polyurethanes, polyamides, epoxys, polyvinylpyrrolidone and polyvinylpyrrolidone copolymers, polyesters, mixtures thereof, and copolymers thereof.

6. The prefinished fiber cement article of claim 5, wherein the adhesive is an ethylene acrylic acid copolymer and ethyl methacrylate copolymer mixture.

7. The prefinished fiber cement article of claim 5, wherein the adhesive is a heat activated adhesive.

8. The prefinished fiber cement article of claim 5, wherein the adhesive is a pressure activated adhesive.

9. The prefinished fiber cement article of claim 1, wherein the adhesive is applied in a pattern.

10. The prefinished fiber cement article of claim 1, wherein an electrostatic charge is applied to the protective layer prior to applying the protective layer to the finished layer.

11. The prefinished fiber cement article of claim 10, wherein the electrostatic charge applied is up to 50 KV.

12. The prefinished fiber cement article of claim 11, wherein the electrostatic charge applied is between 20 to 40 KV.

13. The prefinished fiber cement article of claim 12, wherein the electrostatic charge applied is about 30 KV.

14. The prefinished fiber cement article of claim 1, wherein the protective layer comprises a UV inhibitor.

15. The prefinished fiber cement article of claim 14, wherein the UV inhibitor is a pigment.

16. The prefinished fiber cement article of claim 1, wherein the protective layer is further treated with a Corona surface treatment.

17. The prefinished fiber cement article of claim 16, wherein the protective layer's surface tension is 32 to 65 dynes.

18. The prefinished fiber cement article of claim 17, wherein the protective layer's surface tension is 34 to 48 dynes.

19. The prefinished fiber cement article of claim 1, wherein the polymer film is formed from a polymer resin selected from the group consisting of polyethylene, polypropylene, polyvinyl chloride, polyvinylidene chloride, polyester, polyamide, silicone, blends thereof, and copolymers thereof.

20. The prefinished fiber cement article of claim 1, wherein the protective layer is formed from a polymer foam.

21. The prefinished fiber cement article of claim 20, wherein the polymer foam is selected form the group consisting of polyethylene, polypropylene, and polystyrene.

22. The prefinished fiber cement article of claim 1, wherein the protective layer further comprises spacers which absorb shock when a plurality of fiber cement articles are stack.

23. The prefinished fiber cement article of claim 1, wherein the protective layer has anti-oxidization additives.

* * * * *